US008972069B1

(12) United States Patent
Hudson et al.

(10) Patent No.: US 8,972,069 B1
(45) Date of Patent: Mar. 3, 2015

(54) SELECTIVE MULTI-PHASE MAXIMUM POWER POINT TRACKING

(71) Applicant: D.Light Design, Inc., San Francisco, CA (US)

(72) Inventors: Michael Hudson, Portland, OR (US); Ned Tozun, San Jose, CA (US)

(73) Assignee: d.light design, Inc., San Francisco, CA (US)

( * ) Notice: Subject to any disclaimer, the term of this patent is extended or adjusted under 35 U.S.C. 154(b) by 0 days.

(21) Appl. No.: 14/332,168

(22) Filed: Jul. 15, 2014

Related U.S. Application Data

(60) Provisional application No. 61/946,582, filed on Feb. 28, 2014, provisional application No. 62/014,037, filed on Jun. 18, 2014.

(51) Int. Cl.
*G05B 15/02* (2006.01)
*G05F 1/67* (2006.01)

(52) U.S. Cl.
CPC ..................................... *G05B 15/02* (2013.01)
USPC ......................................... 700/287; 700/291

(58) Field of Classification Search
None
See application file for complete search history.

(56) References Cited

U.S. PATENT DOCUMENTS

| | | | | |
|---|---|---|---|---|
| 2008/0141998 | A1* | 6/2008 | Sun ............................... | 126/601 |
| 2011/0282514 | A1* | 11/2011 | Ropp et al. ..................... | 700/297 |
| 2013/0051092 | A1* | 2/2013 | Cooper et al. ................. | 363/37 |
| 2013/0249295 | A1* | 9/2013 | Hsieh et al. .................... | 307/43 |

OTHER PUBLICATIONS

Dolara et al. J.Elecromagnetic Analysis & Applications, "Energy Comparison of Seven MPPT Techniques for PV Systems" vol. 3, pp. 152-162, 2009.*
Esram et al. IEE Transactions on Energy Conversion "Comparison of Photovoltaic Array Maximum Power Point Tracking Techniques" vol. 22, No. 2 pp. 439-449, Jun. 2007.*
Ankaiah, B. et al., "MPPT Algorithm for Solar Photovotaic Cell by Incremental Conductance Method," *International Journal of Innovations in Engineering and Technology (IJIET)*, Feb. 2013, vol. 2, No. 1, pp. 17-23.
Wikipedia, "Maximum power point tracking," Jan. 22, 2013, located at <<https://web.archive.org/web/20130131035023/http://en.wikipedia.org/wi . . . >>, 9 pages.
Yu, Z. et al., "Renewable Energy Through Micro-Inverters," Apr. 2009, located at <<http://powerelectronics.com/discrete-power-semis/renewable-energy-thr . . . >>, 7 pages.

* cited by examiner

*Primary Examiner* — Sean Shechtman
*Assistant Examiner* — Steven Garland
(74) *Attorney, Agent, or Firm* — Morgan, Lewis & Bockius LLP

(57) ABSTRACT

A controller for controlling operation of a solar power system is disclosed. The controller receives electrical power from an energy capture device and outputs electrical power to one or more external loads. The controller initiates a first maximum power point tracking algorithm during an epoch. The controller then determines whether the first maximum power point tracking algorithm is satisfactory. If it is, the controller continues using the first maximum power point tracking algorithm. If it is not, the controller switches to second maximum power point tracking algorithm. The first and second maximum power point tracking algorithms may be optimized for different environmental conditions, such as different amounts of sunlight incident on a solar panel.

25 Claims, 13 Drawing Sheets

SELECTIVE MULTI-PHASE MAXIMUM POWER POINT TRACKING

RELATED APPLICATIONS

This application claims priority and benefit to U.S. Provisional Application No. 61/946,582, filed Feb. 28, 2014, entitled "Selective Multi-Phase Maximum Power Point Tracking," and to U.S. Provisional Application No. 62/014,037, filed Jun. 18, 2014, entitled "Selective Multi-Phase Maximum Power Point Tracking," which are hereby incorporated by reference in their entireties.

TECHNICAL FIELD

The disclosed implementations relate generally to solar power generation control, and more specifically, to maximum power point tracking for solar power generation systems.

BACKGROUND

Photovoltaic panels, more commonly known as solar panels, are attractive methods of generating clean, renewable energy, and are particularly useful in remote or underserved areas where grid-supplied power is not readily available. Solar panels convert solar energy into electrical energy that can be used to power appliances, charge batteries, and perform other useful tasks. Various environmental conditions affect the efficiency and power production capabilities of a solar panel, however. The amount of power that a solar panel can generate depends, for example, on the temperature of the solar panel, the amount and/or brightness of the light incident on the solar panel, and the magnitude of the load(s) that are placed on the solar panel.

For a given operating condition of a solar panel (e.g., a given temperature and amount of incident light), there is an optimal set of load characteristics that will result in a maximum power output of the solar panel. Thus, in order to achieve the maximum amount of power from a solar panel for a given condition, certain electrical characteristics of the load (e.g., the impedance and/or resistance experienced by the solar panel) must be kept at the optimal value. However, operating conditions for a solar panel can change from day to day, and even from minute to minute. Accordingly, techniques for tracking the maximum power point of a solar panel, for example maximum power point tracking (MPPT) techniques, have been developed. But MPPT techniques are not all equally effective for all possible conditions. For example, a MPPT technique that works well for bright sunlight conditions may not work as well for heavily overcast conditions. Thus, even when using MPPT techniques, the full power generation capabilities of a solar panel may not be achieved across the full range of environmental conditions in which the solar panel operates.

SUMMARY

Accordingly, it would be advantageous to provide systems and methods that employ different MPPT techniques and/or algorithms for different environmental conditions. For example, as described herein, a controller for use with a solar power generation system monitors the contemporaneous environmental conditions of the solar panel, and selects an MPPT algorithm that is suited for that particular environmental condition. Accordingly, the solar panel will be able to operate at or near its optimal power level throughout a broader spectrum of environmental conditions, thus increasing the net amount of power generated by a solar power generation system over a given period.

A maximum power point tracking method is disclosed. In some implementations, the method is performed at a controller having an input configured to receive electrical power from one or more energy capture devices, and an output configured to provide electrical power to an external load. The method includes initiating a first maximum power point tracking algorithm during an epoch. The method further includes adjusting, according to the first maximum power point tracking algorithm, an electrical property affecting an apparent load resistance applied to the one or more energy capture devices. The method further includes, prior to an end of the epoch, determining whether the first maximum power point tracking algorithm is satisfactory. The method further includes, in accordance with a determination that the first maximum power point tracking algorithm is satisfactory, continuing to use the first maximum power point tracking algorithm and continuing to adjust the electrical property according to the first maximum power point tracking algorithm during the epoch. The method further includes, in accordance with a determination that the first maximum power point tracking algorithm is unsatisfactory, (i) switching to a second maximum power point tracking algorithm during the epoch, and (ii) adjusting the electrical property according to the second maximum power point tracking algorithm, wherein the first maximum power point tracking algorithm is different from the second maximum power point tracking algorithm.

In accordance with some implementations, a computer system (e.g., a client system, a server system, or a solar power system controller) includes one or more processors, memory, and one or more programs. The one or more programs are stored in the memory and are configured to be executed by the one or more processors. The one or more programs include instructions for performing the operations of any of the methods described above or disclosed herein. In accordance with some implementations, a non-transitory computer readable storage medium has stored therein instructions which, when executed by one or more processors, cause an apparatus (e.g., any device having one or more processors or controllers) to perform the operations of any of the methods described above or disclosed herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
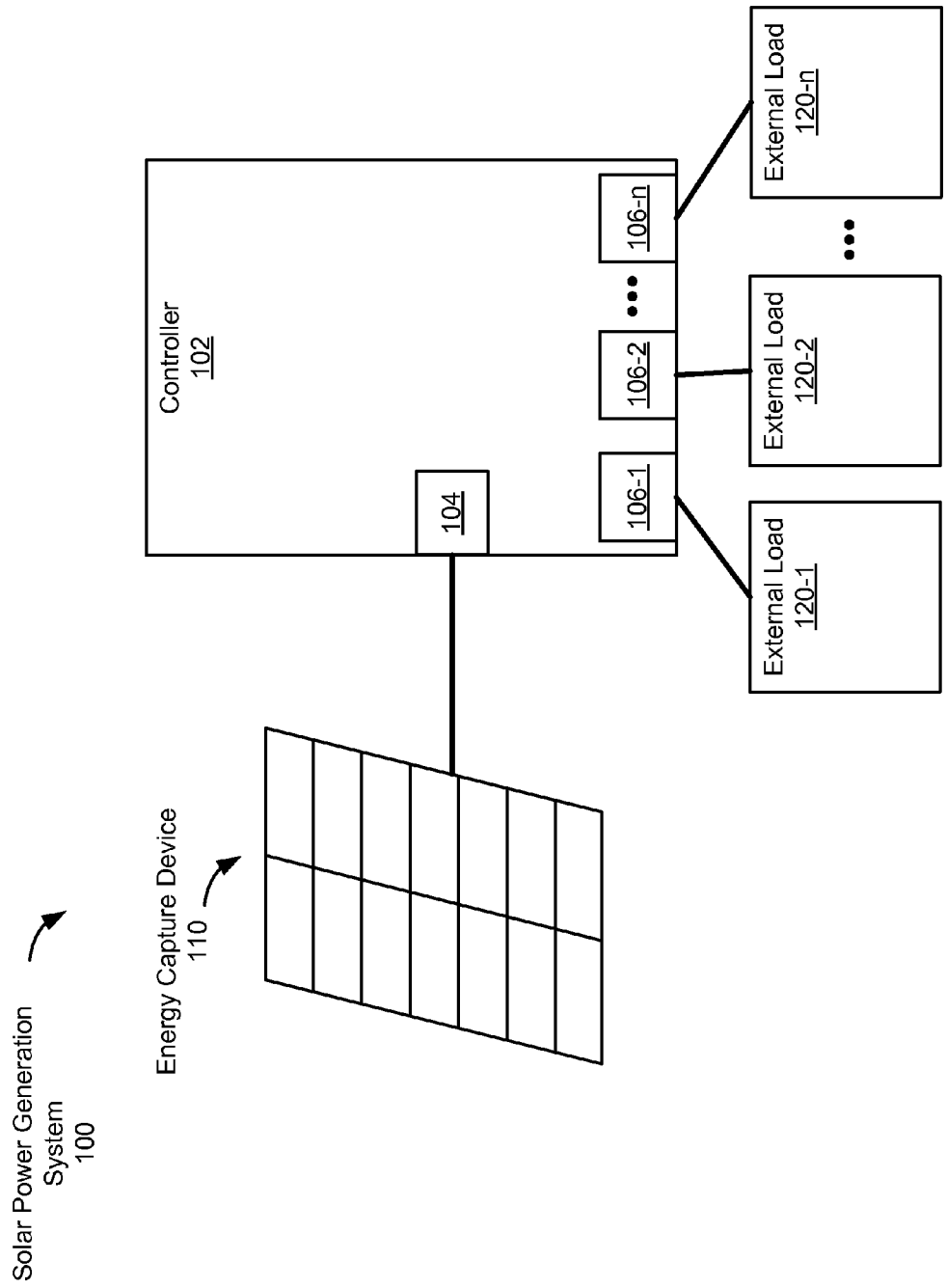
FIG. 1 is a block diagram illustrating a solar power generation system, in accordance with some implementations.

Attention is now directed to the figures, and in particular to FIG. 1, which is a block diagram of a solar power generation system 100, in accordance with some implementations. The solar power generation system 100 includes a controller 102, an energy capture device 110, and an external load 120 (e.g., external loads 120-1 . . . 120-n). Although not illustrated, solar power generation system 100 may include more than one energy capture device 110.

In some implementations, the energy capture device 110 is a solar panel constructed of one or more photovoltaic cells. The photovoltaic cells are made in any appropriate manner and made of any appropriate materials. For example, in some implementations, the photovoltaic cells are made of monocrystalline silicon, polycrystalline silicon, amorphous silicon, cadmium telluride, copper indium selenide/sulfide, GaAs-based multijunction material systems, or any other appropriate material or combination of materials.

The external load 120 is any suitable electrical load that receives electrical power from the energy capture device 110 via the controller 102. In some implementations, the external load is an electrical device, such as a light (e.g., a lantern, flashlight, or any other type of light), a mobile telephone, a radio, a laptop computer, a tablet computer, a battery charger, or any other appropriate electrical device. In some implementations, the external load 120 is an energy storage device, such as a rechargeable battery or a capacitor, such as a battery of an electrical device (e.g., a lantern, flashlight, mobile telephone, computer, radio, etc.).

In some implementations, the external load 120 is a direct current (DC) load. In some implementations, the external load 120 is an alternating current (AC) load. Where the external load 120 is an AC load, the controller 102 includes power conversion components (e.g., an inverter) to convert DC power produced by the energy capture device 110 to the appropriate AC power required by the load. Where the external load 120 is an active power grid (or other active AC power line), the power conversion components of the controller 102 are capable of supplying AC current in the phase, frequency, voltage, and/or current required by the external load 120.

The controller 102 includes a power input 104 and a power output 106 (e.g., power outputs 106-1 . . . 106-n). The controller 102 is configured to receive electrical power from the energy capture device 110 via the power input 104, and provide power to the external load 120 via the power output 106. The controller 102 includes hardware and/or software for performing various types of power conversion, conditioning, and sensing tasks. In some implementations, the controller 102 contains hardware and/or software suitable for sensing electrical characteristics of the energy capture device 110 (and/or any aspect of the system 100) and for adjusting the electrical characteristics of the load experienced by the energy capture device 110. In some implementations, the controller 102 includes hardware and/or software for determining power, voltage, and current values (as well as values of any other appropriate electrical characteristics) at various points within the controller 102, the energy capture device 110, and the external load 120. In some implementations, the controller 102 contains hardware and/or software for performing maximum power point tracking (MPPT). Examples of MPPT techniques and algorithms used by the controller 102 are discussed herein.

The power input 104 connects the controller 102 to the energy capture device 110. While FIG. 1 illustrates a controller with a single power input 104, in some implementations, additional power inputs are included. In some such cases, the controller 102 treats each connected energy capture device independently. For example, in some implementations, the controller 102 employs a separate instance of an MPPT algorithm (e.g., method 500, described herein) for each energy capture device. In other such cases, the controller 102 treats the connected energy capture devices collectively. For example, the controller 102 employs a single instance of an MPPT algorithm (e.g., method 500, described herein) for the combined input from the energy capture devices. Where multiple energy capture devices are treated collectively, they may be connected in serial, parallel, or any combination of serial and parallel connections. In some implementations, the controller itself selects and implements one of multiple possible electrical connection configurations for the multiple energy capture devices (e.g., series connections, parallel connections, combinations of serial and parallel connections, etc.) based on, for example, the respective environmental conditions of the respective energy capture devices.

The power output 106 connects the controller 102 to the external load 120. While FIG. 1 illustrates multiple power outputs 106-1 . . . 106-n and multiple corresponding external loads 120-1 . . . 120-n, for ease of description, the present discussion frequently refers to a single power output 106 and a single external load 120. However, it will be understood that any reference herein to a single power output and/or external load applies equally to multiple power outputs and/or external loads.

FIG. 1 can be understood as both a functional description of the solar power generation system 100, as well as one example implementation of the components present in an example system. While the energy capture device 110, the controller 102, and the external load 120 are shown in FIG. 1 as separate, connected, components, this particular arrangement is merely an example, and these components may be combined in various manners. For example, in some implementations, the controller 102 is combined with the energy capture device 110 in a common housing or structure. In some implementations the controller 102 is combined with one or more of the external loads 120-1 . . . 120-n in a common housing or structure. In some implementations, the energy capture device 110, the controller 102, and one or more of the external loads 120-1 . . . 120-n are all combined in a common housing or structure.

As noted above, the amount of power that a solar panel can produce depends on various factors. For example, different levels of radiant energy incident on a solar panel results in different levels of power produced by the panel. As a specific example, a given solar panel is able to produce more power when exposed to direct sunlight than when exposed to overcast conditions (or other conditions in which less radiant energy is incident on the solar panel, such as when the panel is dirty, shaded/obstructed from direct sunlight, or the like). This relationship is illustrated in FIG. 2B, which shows an example of a graph of power versus voltage for a solar cell when exposed to different amounts of radiant energy. In particular, curve 222, which corresponds to a relatively higher exposure to radiant energy (e.g., direct sunlight), exhibits a higher maximum power value than curves 224 and 226, which correspond to relatively lower radiant energy (e.g., caused by indirect or partial sunlight, overcast skies, suspended particulate (e.g., dust), dawn or dusk, obstructed panels (e.g., dirt, shade), etc.).

The amount of power produced by a solar panel is also related to the voltage at which the solar panel is operating. In particular, the current that is produced by the solar panel for a given environmental condition is related to the voltage at which the panel is being operated. The voltage, current, and power of the panel can be controlled by adjusting one or more electrical characteristics of the load experienced by the panel. For example, by changing the resistance and/or impedance experienced by the solar panel (sometimes referred to herein as a load resistance and/or load impedance), a controller can attempt to locate and operate the panel at or near the maximum power point. In some implementations, as described herein, the electrical characteristics of the load experienced by the solar panel are manipulated by changing the duty cycle of a transistor that couples the external load 120 to the energy capture device 110.

Figure 2A:
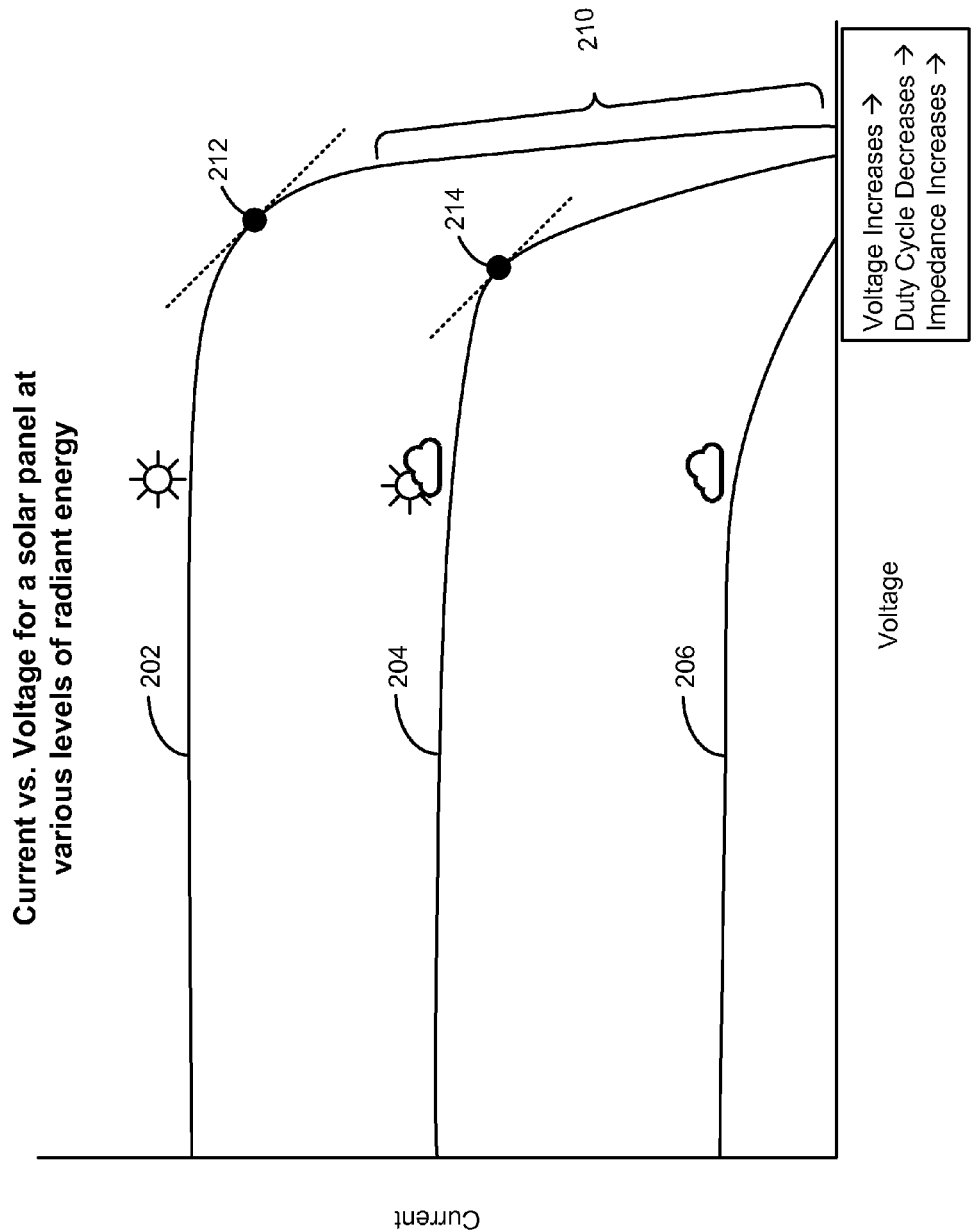
FIGS. 2A-2E and 3 are graphs illustrating characteristics of a solar panel, in accordance with some implementations.
Figure 2B:
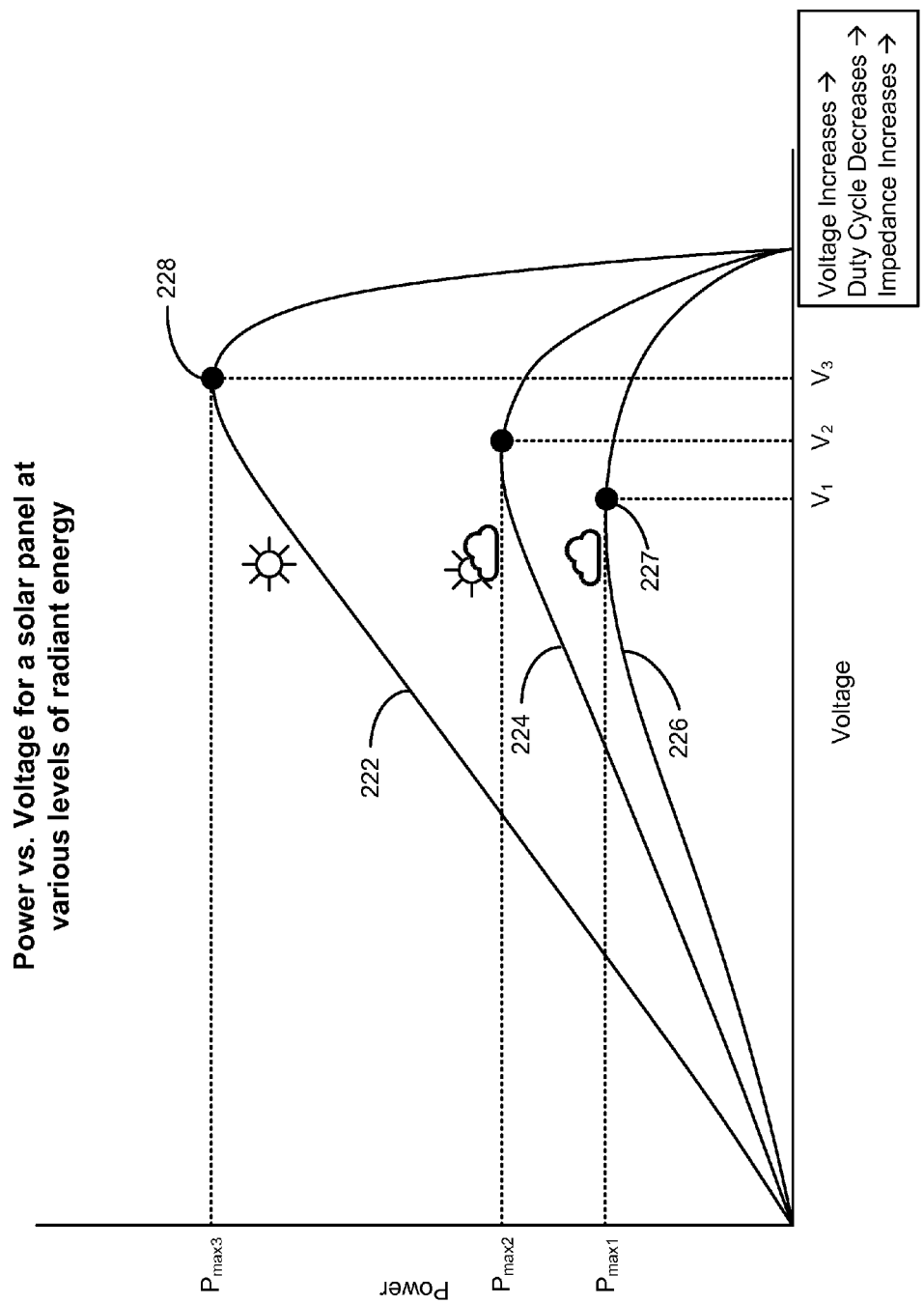

The relationship between voltage and current for a solar panel can be seen in FIG. 2A, which shows an example of a graph of current versus voltage for a solar cell when exposed to different amounts of radiant energy. For example, curve 202, which corresponds to a relatively higher exposure to radiant energy (e.g., direct sunlight), shows that the current produced by the solar panel remains relatively constant as the output voltage increases, and then drops off rapidly after a certain point.

FIGS. 2A and 2B express different values along the y-axis. In particular, the y-axis of FIG. 2A represents current (e.g., the current delivered by a solar panel to an external load at a given voltage), while the y-axis of FIG. 2B represents power (e.g., the power produced by a solar panel at a given voltage). The curves in these figures are mathematically related (because power is a function of voltage and current, both of which can be measured or otherwise determined by the controller 102), and each is derivable from the other when certain characteristics of the system are known and/or measured.

Moreover, as described herein, the current and power produced by a solar panel are also functions, at least in part, of certain electrical characteristics of the load experienced by the solar panel (including, for example, the resistance and/or impedance experienced by the solar panel). In some implementations, the electrical characteristics of the load are controlled by changing the duty cycle of a transistor between the solar panel and the external load. Accordingly, while the x-axes in FIGS. 2A-2E are labeled as voltage, the figures also illustrate the relationship between voltage, duty cycle, and load impedance with respect to the power and current versus voltage curves. Specifically, an increase in the impedance experienced by the solar panel causes a corresponding increase in the voltage of the solar panel. The increase in impedance, in turn, is caused by a decrease in the duty cycle of a transistor.

As can be seen in FIG. 2B, there is a particular output voltage, labeled $V_x$ where x is 1, 2 or 3, for a solar panel that corresponds to a maximum power production for that particular environmental condition. In order to achieve the maximum power output from a solar panel, then, it is advantageous to operate the solar panel at that particular operating point. Notably, the operating point that corresponds to a maximum power output is not the same for all environmental conditions. For example, with reference to FIG. 2B, the peak power under a high radiant energy condition ($P_{max3}$) occurs at a higher voltage ($V_3$) than the voltage ($V_1$) corresponding to peak power ($P_{max1}$) for a low radiant energy condition.

Because the environmental conditions of a typical solar panel vary from moment to moment, operating the solar panel at a single operating point for all environmental conditions results in suboptimal power production during much of its operation. Overall power production can be increased by using maximum power point tracking (MPPT) techniques. Maximum power point tracking algorithms attempt to determine the operating parameters at which the solar panel produces the maximum power for a contemporaneous environmental condition. The operating parameters can then be repeatedly adjusted to ensure that the peak power is being produced despite changing environmental conditions.

An example of an MPPT algorithm is one that varies one or more electrical characteristics of the load in order to detect the set of characteristics at which the maximum power is produced (e.g., point 228). The controller 102 then operates using those characteristics until the controller 102 detects that conditions have changed, and then steps up or down the power curve (e.g., changing the electrical characteristics of the load so as to move the operating point in either the positive or negative x-directions along a power curve) in order to identify the new maximum power point. In some implementations, as described herein, the controller 102 detects that conditions have changed by detecting a change in the power output, the current, or the voltage of the solar panel. In some implementations, whether the controller 102 steps up or down the power curve after determining that the conditions have changed depends on the particular change that is detected. For example, if the power produced by the solar panel increases, the controller 102 moves the operating point in the positive x-direction, or up the power curve, because the new maximum power point is likely to be found in that direction along the power curve (i.e., corresponding to a higher load impedance). On the other hand, if the power produced by the solar panel decreases, the controller 102 moves the operating point in the negative x-direction, or down the power curve. As described herein, in some implementations, the electrical characteristic that the controller 102 actually manipulates in order to step up and down the power curve is the duty cycle of a transistor that couples the external load 120 to the solar panel.

Figure 2C:
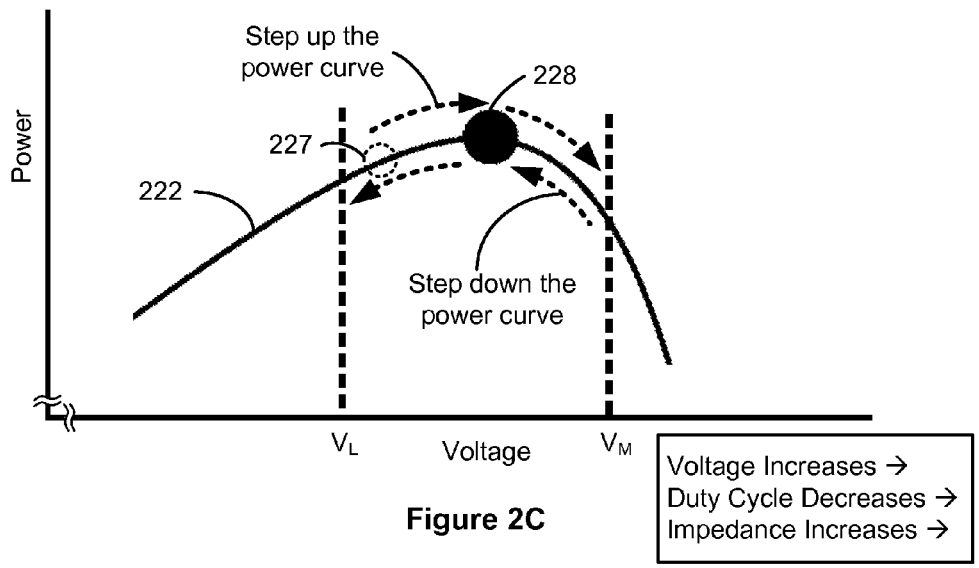

This technique is further illustrated in FIG. 2C, which illustrates how the controller 102 varies the electrical characteristics of the load to seek a new maximum power point after determining that the current operating point may no longer correspond to the actual maximum power point (i.e., because the conditions have changed). In particular, if the controller 102 is operating at point 227, which may, for example, correspond to a previously identified maximum power point, and the controller 102 detects that the power output increases, the controller 102 varies one or more electrical characteristics of the load in order to step up the power curve (i.e., in the positive x-direction) to the new maximum power point. The controller 102 continues to step up the power curve until a first condition is satisfied (e.g., at $V_M$). Moreover, while stepping up the power curve, the controller 102 monitors the power of the solar panel, and stores the maximum power value that it detects while stepping up the power curve. Once the controller 102 detects that the first condition is satisfied (e.g., the slope of the power curve is becoming increasingly negative as the load impedance rises), it then reverses direction and steps down the power curve (i.e., in the negative x-direction). The controller 102 steps down the power curve until a second condition is satisfied (e.g., at $V_L$), while storing the maximum power value that it detects while stepping down. In some implementations, the second condition is satisfied when the slope of the power curve has been substantially constant for a certain duration.

By stepping up and down the power curve in this way, the controller 102 essentially scans the local area of the power curve where the maximum power point should be. In particular, the maximum power point should occur between the points on the curve that correspond to the first and second conditions. More specifically, the maximum power point is typically found somewhere to the right of the portion of the curve having a constant positive slope value, and to the left of the portion of the curve that has a negative slope. Thus, the electrical characteristics of the load that correspond to the maximum power point located between $V_L$ and $V_M$ in FIG. 2C are the characteristics at which the controller 102 should operate in order to achieve the maximum power transfer from the solar panel for those environmental characteristics. Of course, the controller 102 could have initiated the algorithm by first seeking $V_L$ and then seeking $V_M$.

In some implementations, the controller 102 continues to step up and down the power curve one or more additional times, while monitoring the highest power value that is produced, in order to establish the new maximum power point. For example, the controller 102 steps up and down the power curve until the controller 102 consistently identifies the same maximum power point. Once the controller 102 establishes the maximum power point, the controller 102 begins operating using the electrical characteristics of the load that correspond to that point.

In some implementations, the controller 102 varies the impedance of the load placed on the solar panel in order to step up and down the power curve. For example, in some implementations, the controller 102 increases the impedance of the load by decreasing the duty cycle of a transistor in order to climb up the power curve, and decreases the impedance of the load by increasing the duty cycle of a transistor in order to climb down the power curve.

Figure 2D:
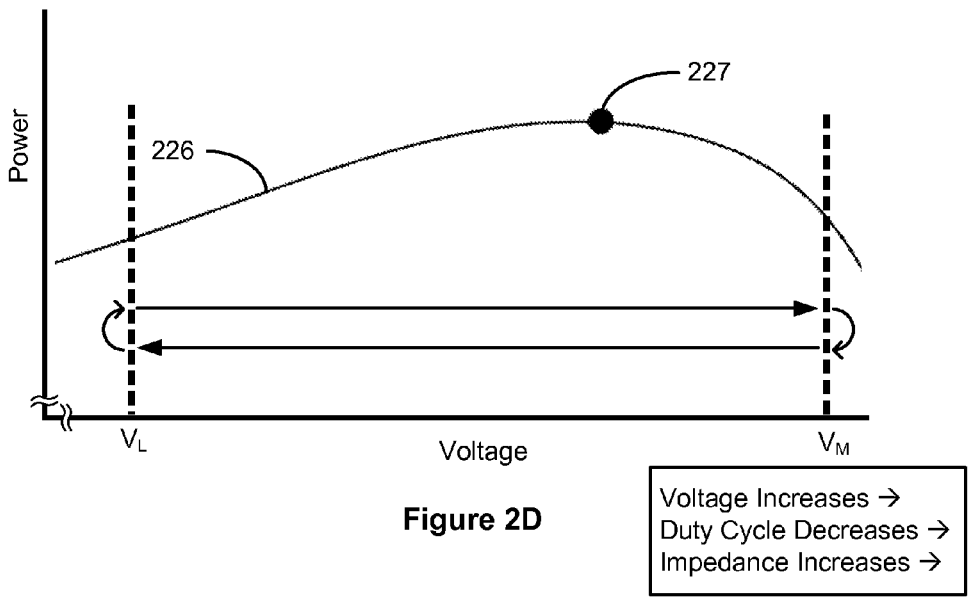

While the above described technique identifies the maximum power point for a given condition, its effectiveness and efficiency depends in part on how it is configured. Specifically, if the above described technique is optimized for sunny day conditions, it may perform suboptimally for cloudy day conditions, and vice versa. For example, while the power drops off relatively steeply on either side of the maximum power point under high radiant energy conditions, the power curves of solar panels under low radiant energy conditions tend to have less drastic power changes around the maximum power point. FIG. 2D illustrates this phenomenon, as the distance between $V_m$ and $V_L$ in FIG. 2D (low radiant energy) is greater than the distance between $V_m$ and $V_L$ in FIG. 2C (high radiant energy). Thus, under lower radiant energy conditions, the controller 102 will have to seek further up and down the power curve to find the maximum power point, resulting in more time spent operating at points that are distant from the maximum power point.

Figure 2E:
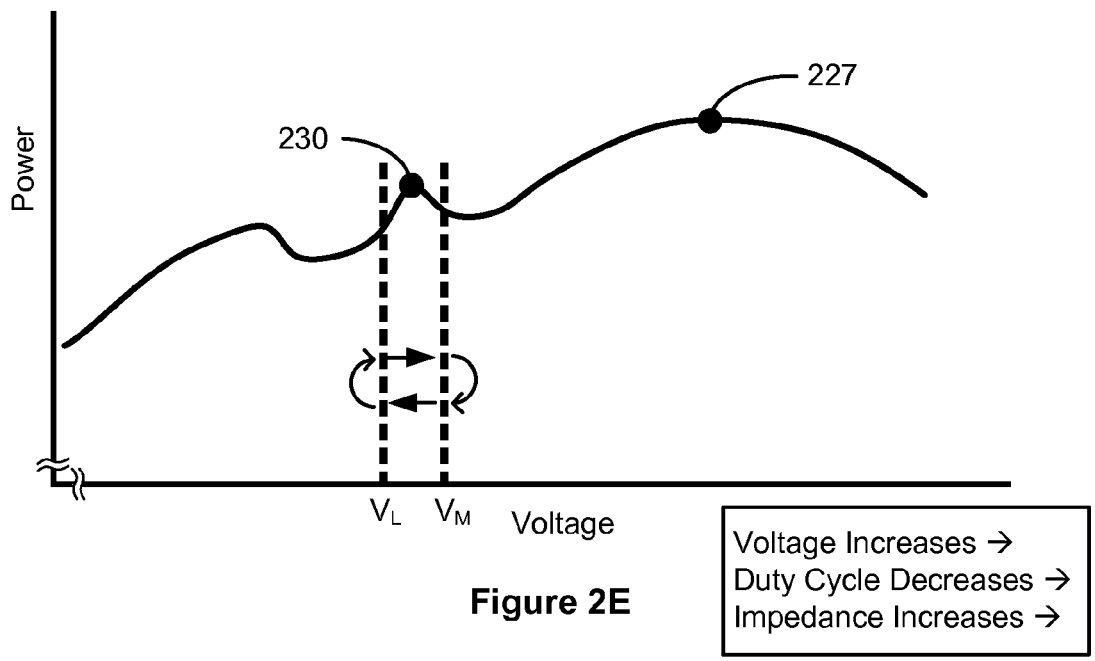

Using an MPPT algorithm that is tuned for high radiant energy conditions under low radiant energy conditions can also result in other suboptimal operation. For example, while the power curve 226 in FIGS. 2B and 2D appears to be very smooth, this tends not to be true in practice. In particular, the curve may, in fact, have local maximums that do not correspond to the actual maximum power point of the curve. FIG. 2E illustrates a portion of the curve 226 showing a local maximum 230 that is not at the maximum power point 227. If an MPPT algorithm that is tuned for high radiant energy conditions is used under conditions represented by curve 226, the controller 102 may incorrectly identify point 230 as the maximum power point. In other words, because sunny day conditions tend to result in a single, distinct maximum power point, an algorithm tuned for such conditions seeks around the maximum power point only a small amount. This can result in the undesired consequence of operating at a local maximum value, even though seeking through a greater range of the power curve would result in the controller 102 identifying the true maximum power point.

Thus, as shown above, an MPPT algorithm that is well suited to maintain operation at the maximum power point under high radiant energy conditions is not necessarily well suited to maintaining operation at the maximum power point under lower radiant energy conditions. Accordingly, in some implementations, the controller 102 uses different MPPT algorithms (and/or applies different configurations to the same MPPT algorithm) for different environmental conditions. For example, when the energy capture device 110 is exposed to high radiant energy conditions (e.g., direct sunlight) the controller 102 uses a MPPT algorithm that is particularly suited to those conditions, and when the conditions change to a lower radiant energy condition (e.g., dawn, dusk, cloud cover, dirty solar panels, etc.), the controller 102 changes to a different MPPT algorithm (or a different configuration of the same MPPT algorithm) that is more suited to those conditions. As described herein, in some implementations, a low radiant energy MPPT algorithm uses larger step sizes to traverse the power curve. For example, a high radiant energy MPPT algorithm will step up and down the power curve by making small changes in the load impedance. Because of the steepness of the power curve near the maximum power point, these small changes allow the controller 102 to find the maximum power point within a relatively small range of load impedance values. Because the maximum power point of the power curve is less well defined under low radiant energy conditions, however, the same small changes in load impedance would result in the controller 102 taking much longer to identify the peak point. Specifically, the points at which the first and second conditions are satisfied under low radiant energy conditions are more distant from each other than they are under high radiant energy conditions, meaning that more steps (and hence more time) would be required in order to step between those points. Thus, in some implementations, the low radiant energy MPPT algorithm uses larger step sizes when seeking the maximum power point. Accordingly, the controller 102 can cover the distance between the first and second conditions (i.e., corresponding to $V_L$ and $V_M$) more quickly, and spend less time operating at points that are distant from the maximum power point.

By switching, in real-time, between different MPPT algorithms to suit changing environmental conditions, the controller 102 can more closely track the maximum power point throughout a period of operation, resulting in a net increase in the power produced by an energy capture device 110 over that period, thus increasing the usefulness and efficiency of the solar power generation system.

In addition to using different MPPT algorithms for different environmental conditions, in some implementations, the controller 102 also performs a maximum power point seeking scan in response to various events and/or triggers. Whereas the MPPT algorithms described herein are used to maintain operation at or near the maximum power point with a minimum amount of seeking, the maximum power point seeking scan varies the electrical characteristics of the load over a greater range in order to gain a more comprehensive view of the contemporaneous environmental conditions. For example, instead of gradually shifting from an existing operating point to a new operating point, as described above, the controller 102 interrupts the current MPPT algorithm and begins to step up the power curve from a relatively low point on the power curve. The controller 102 continues to step up the power curve to a point that is distinctly past the maximum power point. By scanning such a large portion of the power curve, the controller 102 identifies the true maximum power point while overlooking local maximums that the controller 102 might have otherwise incorrectly identified as a maximum power point. Moreover, as a result of the maximum power point seeking scan, the controller 102 determines whether the power curve is characteristic of a high radiant energy condition or a low radiant energy condition, and, thus, which type of MPPT algorithm should be used thereafter (i.e., a high radiant energy MPPT algorithm or a low radiant energy MPPT algorithm).

Figure 3:
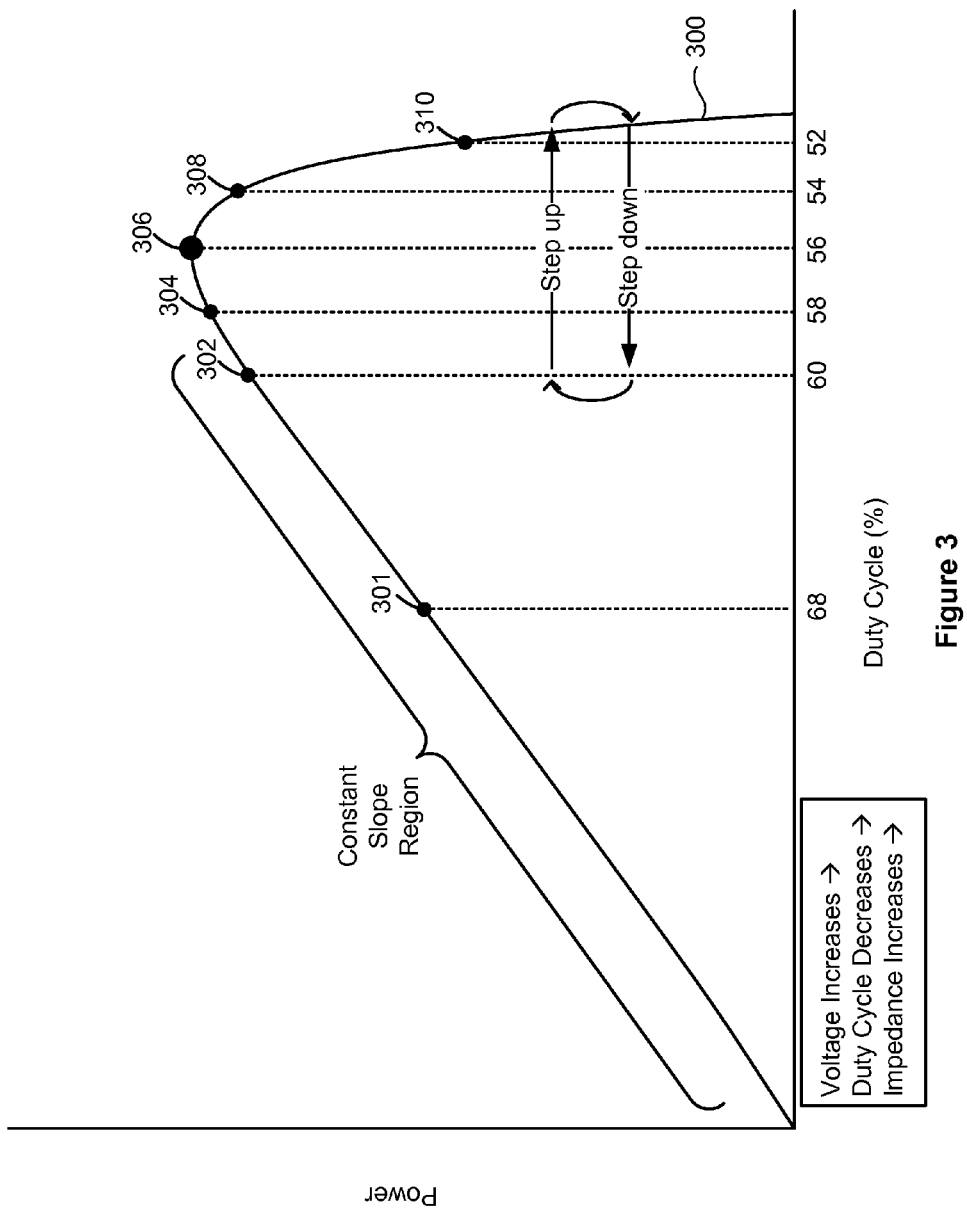

Additional details of an example MPPT algorithm are discussed with reference to FIG. 3. FIG. 3 illustrates an example of a power curve 300 representative of a solar panel under a given environmental condition. While the curve 300 is essentially identical to the curve 222 in FIG. 2A, the x-axis lists duty cycle values instead of voltages. This is because, in some implementations, the controller 102 includes a transistor (e.g., a field effect transistor ("FET")) or other solid-state switching device between the solar panel and the external load to vary the impedance of the load experienced by the solar panel (and, hence, the voltage of the solar panel). Specifically, respective duty cycle values (i.e., ratios of on-time to off-time during a period) of the transistor correspond to respective impedance values. Thus, the controller 102 varies the impedance of the load experienced by the solar panel (and thus climbs up or down the power curve) by changing the duty cycle of the transistor.

In some implementations, the controller 102 uses a stepping technique, whereby the controller 102 varies the duty cycle of the transistor over a series of steps in order to climb up and down the power curve, and maintains a power trend based on measurements taken at each step. In some implementations, a power trend is a value of the slope of the power curve, and is calculated based on previous power measurements. For example, at each step (e.g., corresponding to a particular duty cycle value), the controller 102 determines the slope of the curve based on the power detected at the most recent step and one or more previous steps. Based at least in part on the power trend, the controller 102 finds and operates at or near the maximum power point for a given environmental condition, and determines how and when to change the algorithm to provide better results (e.g., when the environmental conditions change such that the concurrent MPPT algorithm is no longer suitable). In some implementations, the power trend is not a calculated slope value, but corresponds to and/or is indicative of the slope of the power curve. For example, in some implementations, slope values are represented by the difference in a detected power value between subsequent steps and/or measurements. For example, the slope of the power curve between step 302 and step 304 in FIG. 3 can be represented simply as the difference in power detected at each of these points.

In FIG. 3, several example duty cycle values are labeled along the x-axis, representing steps of an MPPT algorithm under some operating conditions. (It will be understood that these duty cycle values are merely examples, and, depending on the environmental conditions, these values may or may not correspond to the particular power value or location indicated on the curve 300.) Points 302, 304, 306, 308, and 310 represent example duty cycles at which the controller 102 will operate when using an example MPPT algorithm. The curve 300 in FIG. 3 represents an example of a power curve for a high radiant energy condition (e.g., a sunny day).

As the controller 102 operates at each step (corresponding to a particular duty cycle value), the controller 102 determines the power delivered by the solar panel during the step. Based on the power determined at each step, the controller 102 determines a power trend of the power curve. In some implementations, the power trend is a slope of the power curve, and/or a value that is indicative of the slope of the power curve between two or more steps. For example, after the controller 102 steps from 60% to 58%, the controller 102 calculates a slope of the curve between points 302 and 304. Subsequently, after the controller 102 steps from 58% to 56%, the controller 102 calculates a slope of the curve between at least points 304 and 306. The controller 102 can thus monitor how the slope of the curve changes as the duty cycle decreases with each step.

The controller 102 also measures the power produced by the solar panel at each step in order to determine whether it is higher than the power at the last step (which indicates that the previous step was not the maximum power point), or whether it is lower than the last step.

In some implementations, the conditions that govern how far an MPPT algorithm steps up and down the power curve in order to locate the maximum power point are based, at least in part, on the power trend at points along the power curve. In particular, when traversing the power curve in the positive x-direction, the controller 102 continues to decrease the duty cycle and determine the power at each step until a first condition is met. For example, the controller 102 decreases the duty cycle (e.g., traversing the power curve in a positive x-direction) until the power trend is indicative that the slope has become negative, is negative for a predetermined number of steps (e.g., 5), and/or is increasingly negative for a certain number of steps (e.g., each power trend value (e.g., slope) is more negative than the last value for a certain number of steps). In FIG. 3, for example, the controller 102 would determine that the power trend is increasingly negative from points 306 to 308 to 310. In some implementations, the first condition encompasses a plurality of different sub-conditions, any of which are sufficient to cause the first condition to be satisfied. For example, in some implementations, a first sub-condition is whether the power trend is negative for a predetermined number of steps (e.g., 5 steps, or any other appropriate number of steps), and a second sub-condition is whether the power trend is increasingly negative for a predetermined number of steps (e.g., 3 steps, or any other appropriate number of steps). Thus, if the portion of the power curve beyond the maximum power point drops off precipitously (i.e., the curve is steepening in the positive x-direction), the satisfaction of the second sub-condition suffices to satisfy the first condition. On the other hand, if the portion of the power curve beyond the maximum power point does not drop off precipitously (i.e., the curve decreases with a substantially constant slope), the satisfaction of the first sub-condition is necessary for the first condition to be satisfied. This way, if the portion of the power curve beyond the maximum power point does drop off precipitously, the controller 102 will not bother to take additional steps in the positive x-direction, because detection of the increasingly negative power trend is a sufficient indicator that the controller 102 has passed the maximum power point, and additional steps in that direction would only serve to unnecessarily reduce the power of the solar panel.

Once the first condition is satisfied, the controller 102 begins to climb down the power curve (i.e., traversing the power curve in the negative x-direction) by increasing the duty cycle with each subsequent step (e.g., from 52% to 54%, and so on). The controller continues to increase the duty cycle with each subsequent step until a second condition is satisfied. In some implementations, the second condition is that the power trend of the curve is constant for a certain number of steps (e.g., 5 steps). In some implementations, the controller 102 identifies a constant slope condition when the difference in power between subsequent steps is constant (e.g., the difference in power between point 306 and point 304 is 10 W, and the difference in power between point 304 and point 302 is also 10 W). In some implementations, the second condition is that the slope of the curve is substantially equal to a certain value (e.g., a slope of 1), and/or is substantially equal to a certain value for a certain number of steps (e.g., 3 steps).

As described above, by oscillating back and forth between these two conditions, the controller 102 attempts to identify the maximum power point for the contemporaneous environmental condition (e.g., a point at which the power curve has a slope of zero). The controller 102 can then begin to operate at a duty cycle that corresponds to the maximum power point, until a sufficient change in the environmental conditions is detected (e.g., the power produced by the energy capture device changes while the controller 102 is operating at the previously identified maximum power point).

In some implementations, the controller 102 is configured to oscillate around the maximum power point more than once, in order to confirm that the maximum power point is stable and was accurately identified. For example, after climbing up the power curve until the first condition is satisfied (e.g., stepping from step 302 through 310) and climbing down the power curve until the second condition is satisfied (e.g., stepping from step 310 through 302), the controller 102 repeats this cycle a certain number of times. In some implementations, the controller 102 repeats the cycle until the maximum power point identified during each cycle (e.g., the point at which the slope changes from positive to negative) is stable. In some implementations, the maximum power point is stable when the maximum power point is substantially the same (e.g., within +/−1%, 2%, 3%, 4%, 5%, or any other appropriate range) over a predetermined number of cycles (e.g., 1, 2, 3, 4, 5, 6, 7, 8, 9, or 10 cycles, or any other appropriate number of cycles). In some implementations, a cycle includes a series of steps in the positive x-direction and a series of steps in the negative x-direction. In some implementations, a cycle includes a series of steps in only one direction.

Moreover, as described above, in some implementations, the controller 102 also increases or decreases the step sizes (e.g., the amount by which the duty cycle changes between steps) under certain circumstances in order to further increase the efficiency and/or effectiveness of the system. For example, in some implementations, if the controller does not detect a particular condition after a certain number of steps, it increases the step size. As one specific example, if the controller 102 is traversing the power curve in the positive x-direction, but does not detect a negative slope after 5 steps at a 1% duty cycle decrease per step, the controller 102 begins decreasing the duty cycle by 2% per step. If the controller 102 does not detect a negative slope after 5 steps at the 2% duty cycle decrease per step, the controller 102 begins decreasing the duty cycle by 5% per step. Increasing the step size allows the controller 102 to more quickly find the maximum power point (e.g., where the slope transitions from a positive value to a negative value). The foregoing values of the step size and the number of steps taken before changing the step size are merely examples, and other values are also contemplated. In some implementations, once the controller 102 identifies the maximum power point after increasing the step sizes, the controller 102 begins to operate at the maximum power point, and resets the step sizes for subsequent steps to the smallest allowable step size. As noted above, the value of the smallest allowable step size depends, in part, on whether the controller 102 is using a high radiant energy MPPT algorithm or a low radiant energy MPPT algorithm. Thus, when the controller 102 once again begins seeking the maximum power point (e.g., in response to detecting that the power produced by the energy capture device has changed while the controller 102 was operating at the previously identified maximum power point), it will begin using the smallest allowable step size.

In the foregoing discussion, the terms "increase" and "decrease" correspond to absolute value change in the step size. For example, when the step sizes are increased from 1% to 2%, the actual difference in duty cycle between steps becomes −2% for each step in the positive x-direction, and +2% for each step in the negative x-direction. For ease of notation, this change is referred to as an "increased" step size, even though the actual duty cycle value decreases for steps taken in the positive x-direction.

In some implementations, as described above, in addition to stepping the duty cycle up and down in order to converge on the maximum power point (or in addition to any other appropriate MPPT technique or techniques), the controller 102 performs a maximum power point seeking scan in order to determine the maximum power point for the system at that particular moment. Specifically, the controller 102 starts with a duty cycle of a relatively high value (e.g., 75%, 80%, etc., which correspond to a relatively low voltage), and then proceeds through a series of steps in which the duty cycle is decreased with each step, until a termination condition is satisfied. The termination condition indicates that the controller 102 is almost certainly past the maximum power point for the given environmental conditions, which, in some implementations, corresponds to a duty cycle of 0%, the slope of the power curve reaching a threshold value, or the slope of the power curve having become increasingly negative for a predetermined number of steps. In some implementations, the termination point for the maximum power point seeking scan is when a power trend (e.g., a value that corresponds to a slope of a power curve) is indicative that the slope has become negative, is negative for a predetermined number of steps (e.g., 5), and/or is increasingly negative for a certain number of steps (e.g., each power trend value (e.g., slope) is more negative than the last value for a certain number of steps).

At each step of the maximum power point seeking scan, the controller 102 determines the power produced by the solar panel, and determines whether it is the highest power value detected during the scan. If it is the highest power value, the controller 102 stores the duty cycle at which that power value occurred. If it is not the highest power value, the controller 102 does not store the corresponding duty cycle value. Once the maximum power point seeking scan reaches the termination condition, the stored value will correspond to the maximum power point for the contemporaneous environmental condition, regardless of whether the power curve exhibits local maxima or other irregularities. Of course, in other implementations, some or all the power values are stored during the determination of the maximum power point. For example, in some implementations, the controller has access to registries or other forms of memory where multiple power values are stored. In some implementations, such storage is used for analyzing trends in accordance with the MPPT techniques disclosed herein.

By performing the maximum power point scan in the aforereferenced way, the controller 102 more easily avoids converging on a false maximum power point (e.g., a local maximum point that does not, in fact, correspond to the maximum power point), such as point 230 in FIG. 2E. For example, by performing a maximum power point seeking scan on the curve illustrated in FIG. 2E, the controller 102 would determine that point 230 is not, in fact, the maximum power point, and would instead detect that the maximum power point actually occurs at the duty cycle value corresponding to point 227.

In addition to identifying the maximum power point for the contemporaneous environmental condition, the controller 102 uses the maximum power point seeking scan to determine whether the contemporaneous environmental condition is a high or low radiant energy condition, and, thus, which of multiple candidate MPPT algorithms (and/or which configuration of a single MPPT algorithm) to use thereafter. In some implementations, the controller 102 determines the intensity of the radiant energy based on the slope of the power curve in the constant current region of the power curve. In particular, in some implementations, the slope of the constant current region for a high radiant energy condition is substantially equal to a value of 1, whereas the slope of the constant current region for a low radiant energy condition is substantially equal to a value of 0.5. Accordingly, when the controller 102 is performing the maximum power point seeking scan, the controller 102 determines the slope of the power curve in the constant current region, and based on the value of the slope in that region, determines whether the conditions are indicative of high or low radiant energy conditions. The controller 102 then selects the appropriate MPPT algorithm based on the determination. In some implementations, if the slope is above about 0.5, the conditions are deemed to be high radiant energy conditions. In some implementations, if the slope is below about 1, the conditions are deemed to be low radiant energy conditions. In some implementations, if the slope is below about 0.5, the conditions are deemed to be low radiant energy conditions. The slope values in the preceding example are merely examples. The actual values characteristic of high and low radiant energy conditions may be different depending on various factors, such as the type and/or characteristics of the energy capture device being used, the definitions of "high" and "low" radiant energy conditions (which themselves may be defined differently in different implementations), and the like.

In some implementations, the controller 102 uses any other appropriate technique for differentiating between power curves that are characteristic of different environmental conditions. For example, it is readily apparent in FIG. 2B that the profile for curve 222 (e.g., a high radiant energy condition) is dramatically different from curve 226 (e.g., a low radiant energy condition)—curve 222 is steeper on both sides of the maximum power point than curve 226, which exhibits a flatter, more gradual profile (overall, and in the vicinity of the maximum power point). Moreover, the power drops off much more steeply on either side of the maximum power point on curve 222 (e.g., point 228) than on curve 226 (e.g., point 227). Accordingly, any technique for observing a change from the sharply peaked power curve characteristic of a high radiant energy condition to the flatter power curve characteristic of a lower radiant energy condition (or vice versa) may be used to determine the contemporaneous environmental condition. For example, in some implementations, the controller 102 determines the smallest curvature (e.g., radius of curvature) in the power curve, and the environmental condition, and hence the particular MPPT algorithm to be used, is determined based on the value of the smallest curvature (e.g., if the smallest curvature is smaller than a threshold value, the contemporaneous environmental condition is a high radiant energy condition, and/or if the smallest curvature is larger than a threshold value, the contemporaneous environmental condition is a low radiant energy condition). As another example, in some implementations, the controller 102 determines an area under the power curve, and the environmental condition, and hence the particular MPPT algorithm to be used, is determined based on the area under the power curve (e.g., if the area exceeds a threshold value, the contemporaneous environmental condition is a high radiant energy condition, and/or if the area is smaller than a threshold value, the contemporaneous environmental condition is a low radiant energy condition)). Other techniques may also be used.

In some implementations, the controller 102 performs the maximum power point seeking scan in response to one or more conditions. For example, in some implementations, the controller 102 scans the power curve on a regular schedule (e.g., every 1, 2, 3, 4, 5, 7, 10, 15, 30, 60, or 90 minutes, etc.).

In some implementations, the controller 102 performs the maximum power point seeking scan in response to a failure to locate a maximum power point (e.g., a point at which the slope of the power curve is substantially equal to zero) after a predetermined number of steps while executing an MPPT algorithm. For example, if the controller 102 is stepping up the power curve in order to identify a new maximum power point, and does not detect a negative slope within a certain number of steps, the controller 102 ceases operating according to the MPPT algorithm and instead performs a maximum power point seeking scan in order to (1) identify the current maximum power point, and (2) determine whether the contemporaneous environmental condition is indicative of a high or low radiant energy condition, and, thus, which MPPT algorithm to use following the maximum power point seeking scan.

In some implementations, the controller 102 performs the maximum power point seeking scan in response to a combination of these conditions (e.g., on a regular schedule and upon a failure to identify a maximum power point during steady state operation).

The example system and method described herein describes using one of two different MPPT algorithms depending on the contemporaneous environmental condition. In some implementations, additional MPPT algorithms are also used. For example, instead of using one MPPT algorithm for high radiant energy conditions and another for low radiant energy conditions, in some implementations the controller 102 uses 3, 4, 5, or more MPPT algorithms, each suited to a different environmental condition or amount/intensity of light. This way, each MPPT algorithm can be optimized for a particular characteristic environmental condition and selected for use when the controller 102 detects that particular environmental condition.

Figure 4:
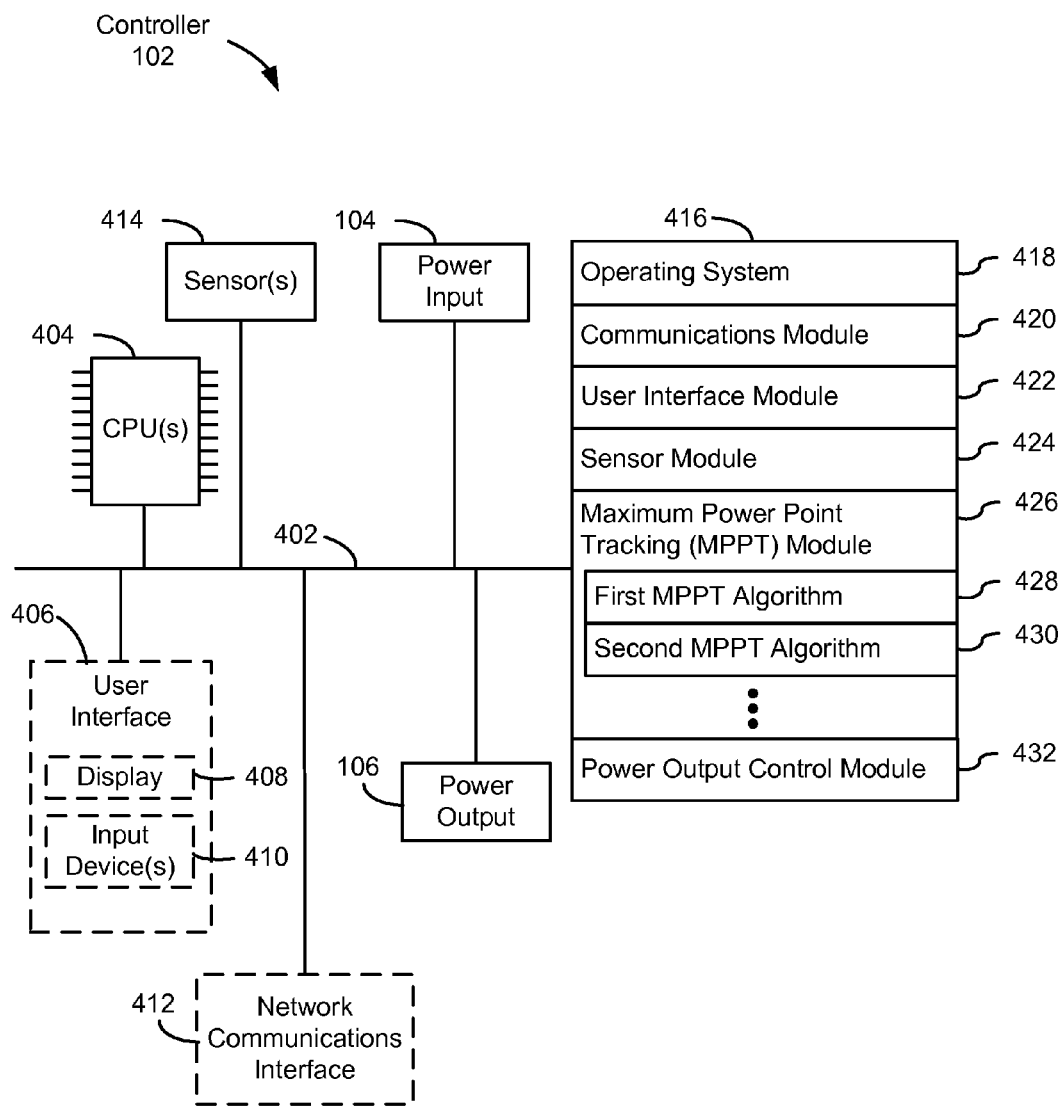
FIG. 4 is a block diagram illustrating a controller for controlling operation of a solar power generation system, in accordance with some implementations.

FIG. 4 is a block diagram illustrating a controller 102, in accordance with some implementations. In some implementations, the controller 102 is a handheld electronic device. For example, in some implementations, the controller 102 is or is incorporated into, any of: a light (e.g., a lantern, flashlight, or any other type of light), a mobile telephone, a radio, a laptop computer, a tablet computer, or any other appropriate electrical device.

The controller 102 typically includes one or more CPUs 404, an optional user interface 406, an optional network communications interface 412 (wired and/or wireless), one or more sensors 414, one or more power inputs 104, one or more power outputs 106, memory 416, and at least one communication bus 402 for interconnecting these components. Each communication bus 402 may include circuitry (sometimes called a chipset) that interconnects and controls communications between system components. In some implementations, the optional user interface 406 includes a display 408 and input device(s) 410 (e.g., keyboard, mouse, touchscreen, keypads, etc.).

The one or more sensors 414 include sensors configured to detect electrical characteristics of various aspects of a solar power generation system of which the controller 102 is part, and include any necessary electrical components, circuits, processors, and components (software or hardware) for sensing various electrical values. For example, in some implementations, the sensors 414 include sensors for detecting any of the following values: power consumed by one or more components of a solar power generation system (e.g., any internal or external components, or any combination of such components); current drawn by one or more components of the solar power generation system; a voltage difference between one or more components of the solar power generation system; and an open-circuit voltage of an energy capture device connected to the controller 102 (e.g., a solar panel). Other sensors are also included, in various implementations, for sensing and/or measuring other values.

In some implementations, sensors 414 also include sensors for detecting other characteristics of a solar power generation system of which the controller 102 is part, including, for example, ambient light conditions, ambient temperature conditions, and the like.

The one or more power inputs 104 include hardware (e.g., connectors, ports, electronic circuitry, etc.) and/or software (e.g., programs, executable instructions, firmware, embedded logic, etc.) that facilitate a mechanical and/or electrical connection between the controller 102 and one or more energy capture devices (e.g., the energy capture device 110, FIG. 1). For example, in some implementations, the one or more power inputs 104 include a socket or plug (e.g., a coaxial DC power connector) for connecting to a corresponding socket or plug of the energy capture device 110.

The one or more power outputs 106 include hardware (e.g., connectors, ports, electronic circuitry, etc.) and/or software (e.g., programs, executable instructions, firmware, embedded logic, etc.) that facilitate a mechanical and/or electrical connection between the controller 102 and one or more external loads 120 (e.g., the external loads 120-1 ... 120-n, FIG. 1). In some implementations, the one or more power outputs 106 include electrical circuitry that is used to change the electrical characteristics of a load connected thereto. For example, the one or more power outputs 106 include and/or are coupled to one or more transistors (e.g., field effect transistors, or "FETs"), which are used, in some implementations, to vary the impedance of the load experienced by an energy capture device coupled to the controller 102. The one or more transistors (and/or other appropriate components) are used, for example, to adjust the electrical characteristics of the load in accordance with an MPPT algorithm, as described below with respect to FIGS. 5A-5F.

Memory 416 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 416 may optionally include one or more storage devices remotely located from the CPU(s) 404 (e.g., a network-connected storage device or service, such as a "cloud" based storage service). Memory 416, or alternately the non-volatile memory device(s) within memory 416, includes a non-transitory computer readable storage medium. In some implementations, memory 416 or the computer readable storage medium of memory 416 stores the following programs, modules and data structures, or a subset thereof:
- an optional operating system 418 that includes procedures for handling various basic system services and for performing hardware dependent tasks;
- an optional communication module 420 that is used for connecting the controller 102 to other computers or devices via the one or more optional network communication interfaces 412 (wired or wireless) and one or more communication networks, such as the Internet, other Wide Area Networks, Local Area Networks, Personal Area Networks, Metropolitan Area Networks, VPNs, local peer-to-peer and/or ad-hoc connections, and so on;
- an optional user interface module 422 that receives commands and/or inputs from a user via the optional user interface 406 (e.g., from the input device(s) 410, which may include keyboard(s), touch screen(s), microphone (s), pointing device(s), and the like), and provides user interface objects on a display (e.g., the display 408);
- a sensor module 424 for communicating with the one or more sensors 414 to receive sensed electrical values, calculate derived values, and programmatically couple the output of the one or more sensors 414 to other components of the controller 102, such as the maximum power point tracking module 426, below;
- a maximum power point tracking module 426 for performing maximum power point tracking, as described herein, including:
  - determining whether an MPPT algorithm in use at a given time is suitable for the environmental conditions in effect at the given time;
  - performing recalibration cycles to determine whether an MPPT algorithm in use at a given time continues to be suitable for the environmental conditions in effect at the given time;
  - executing any of multiple MPPT algorithms, such as the first MPPT algorithm 428, the second MPPT algorithm 430, etc.;
  - switching from one MPPT algorithm to another MPPT algorithm;
  - changing values of configuration parameters for an MPPT algorithm; and
  - determining, according to an MPPT algorithm, one or more operational setpoints for the controller, such as (but not limited to) duty cycle values; and
- a power output control module 432 for adjusting an electrical property affecting an apparent load resistance and/or load impedance experienced by one or more energy capture devices coupled to the controller 102 according to a selected maximum power point tracking algorithm (such as adjusting the duty cycle value of a transistor).

In some implementations, the controller 102 includes a subset of the components and modules shown in FIG. 4. Moreover, in some implementations, the controller 102 includes additional components and/or modules not shown in FIG. 4.

Attention is directed to FIGS. 5A-5F, which are flow diagrams illustrating a maximum power point tracking method 500, in accordance with some implementations. Each of the operations shown in FIGS. 5A-5F may correspond to instructions stored in a computer memory or nontransitory computer readable storage medium. In some implementations, the steps are performed at an electronic device with one or more processors (or cores) and memory storing one or more programs for execution by the one or more processors (or cores). For example, in some implementations, the steps are performed by the controller 102. Moreover, the individual steps of the method may be distributed among multiple devices, or multiple components and/or modules of a device (e.g., controller 102), in any appropriate manner.

The controller 102 initiates a first maximum power point tracking algorithm during an epoch (502) (e.g., with the MPPT module 426). As used herein, an epoch refers to a period of operation of a solar power system. For example, an epoch may refer to an entire solar day (e.g., 24 hours), or to the daylight portion of a solar day. An epoch may also refer to a period of operation of the solar power system that is less than (or longer than) the daylight portion of a solar day. For example, a solar power system may be used only long enough during a day to generate a desired amount of power, such as until a battery is charged to a desired level. An epoch may be delineated by natural phenomenon, such as the period from dawn to dusk, or by human manipulation, such as the period of time between a user activating and deactivating a solar power generation system.

Returning to FIG. 5A, the controller 102 adjusts, according to the first maximum power point tracking algorithm, an electrical property affecting an apparent load resistance applied to the one or more energy capture devices (504) (e.g., with the power output control module 432). In some implementations, adjusting the electrical property according to the first maximum power point tracking algorithm includes adjusting the duty cycle of a transistor between the solar panel and the external load in order to identify a duty cycle that corresponds to the maximum power point and operate the transistor at that duty cycle. Specific techniques for adjusting the electrical property according to the first maximum power point tracking algorithm are discussed herein.

The controller 102, prior to the end of the epoch, determines whether the first maximum power point tracking algorithm is satisfactory (506) (e.g., with the MPPT module 426). In some implementations, a determination whether the first maximum power point tracking algorithm is satisfactory is made as a result of performing a maximum power point seeking scan, as described with respect to (522)-(532).

In accordance with a determination that the first maximum power point tracking algorithm is satisfactory, the controller 102 continues to use the first maximum power point tracking algorithm and continues to adjust the electrical property according to the first maximum power point tracking algorithm during the epoch (508) (e.g., with the power output control module 432).

In accordance with a determination that the first maximum power point tracking algorithm is unsatisfactory, the controller 102 switches to a second maximum power point tracking algorithm during the epoch (510) (e.g., with the MPPT module 426), where the first maximum power point tracking algorithm is different from the second maximum power point tracking algorithm, as described with respect to (522)-(532). The controller 102 then adjusts the electrical property according to the second maximum power point tracking algorithm (512) (e.g., with the power output control module 432).

In some implementations, adjusting the electrical property according to the second maximum power point tracking algorithm includes adjusting the duty cycle of a transistor between the solar panel and the external load in order to identify and operate the transistor at a duty cycle that corresponds to the maximum power point. Specific techniques for adjusting the electrical property according to the second maximum power point tracking algorithm are discussed herein.

In some implementations, the first maximum power point tracking algorithm corresponds to a first power production characteristic of the one or more energy capture devices, and the second maximum power point tracking algorithm corresponds to a second power production characteristic of the one or more energy capture devices. A power production characteristic corresponds to how an energy capture device (e.g., a solar panel) responds to a particular environmental condition across a range of possible operating values (e.g., voltage, apparent resistance, impedance, duty cycle, etc.), and may be visualized/represented as a current versus voltage curve (e.g., FIG. 2A) and/or a power versus voltage curve (e.g., FIG. 2B) of the solar panel under a particular environmental condition. In some implementations, the first power production characteristic corresponds to a condition of higher illuminance of the one or more energy capture devices as compared to a second power production characteristic. In some implementations, the first power production characteristic corresponds to direct sunlight conditions, and the second power production characteristic corresponds to at least partially indirect sunlight conditions. At least partially indirect sunlight conditions include, for example, cloudy conditions, fully or partially shaded conditions, dirty or occluded energy capture devices, and the like.

In some implementations, a determination that the first maximum power point tracking algorithm is satisfactory corresponds to a determination that the one or more energy capture devices are operating according to the first power production characteristic. In some implementations, a determination that the first maximum power point tracking algorithm is unsatisfactory corresponds to a determination that the one or more energy capture devices are operating according to the second power production characteristic.

In some implementations, after switching to the second maximum power point tracking algorithm, the controller 102 determines whether the second maximum power point tracking algorithm is satisfactory prior to the end of the epoch (514) (e.g., with the MPPT module 426). In some implementations, a determination whether the second maximum power point tracking algorithm is satisfactory is made as a result of performing a maximum power point seeking scan, as described with respect to (522)-(532).

Figure 5A:
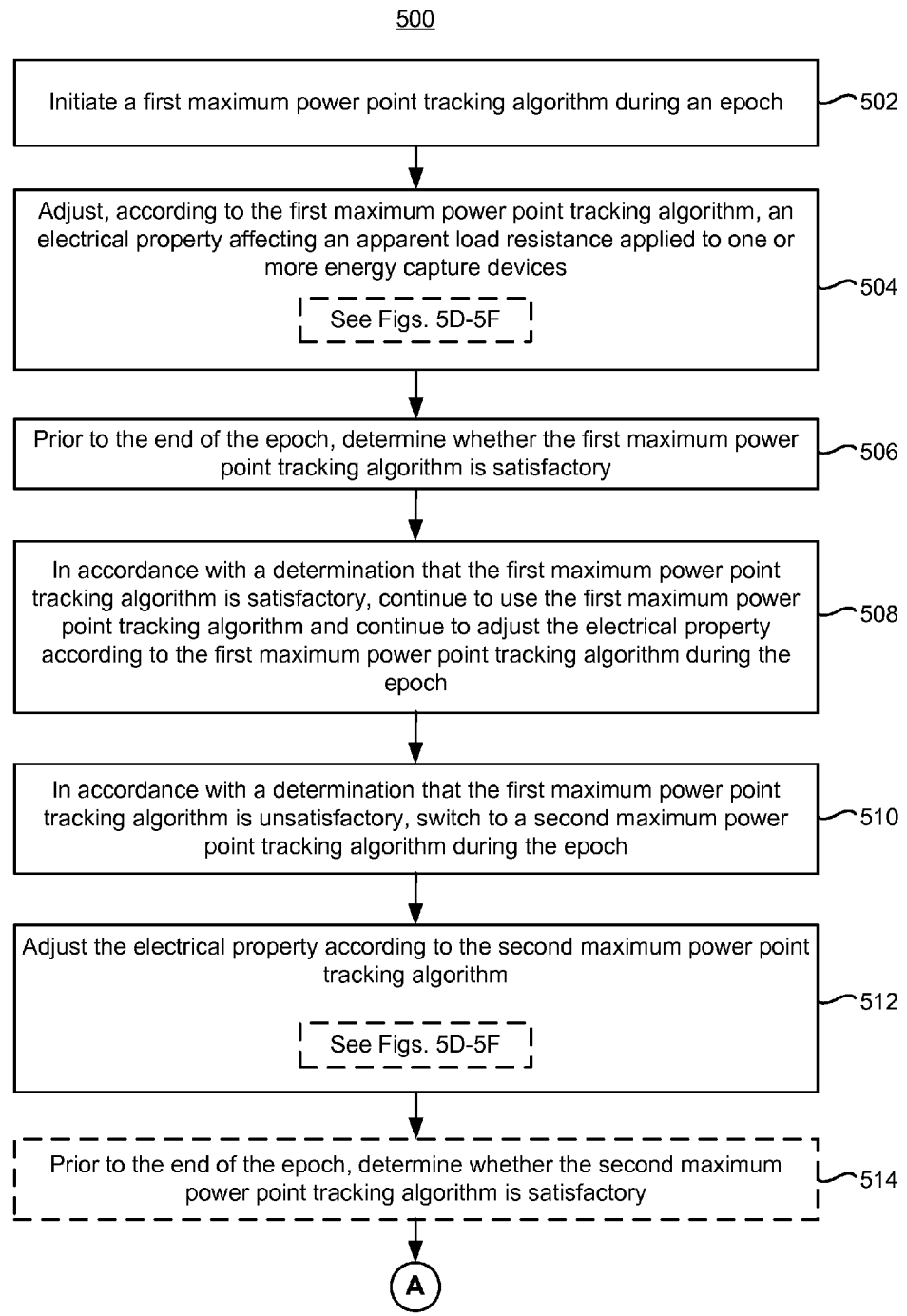
FIGS. 5A-5F are flow diagrams illustrating a maximum power point tracking method, in accordance with some implementations.
Figure 5B:
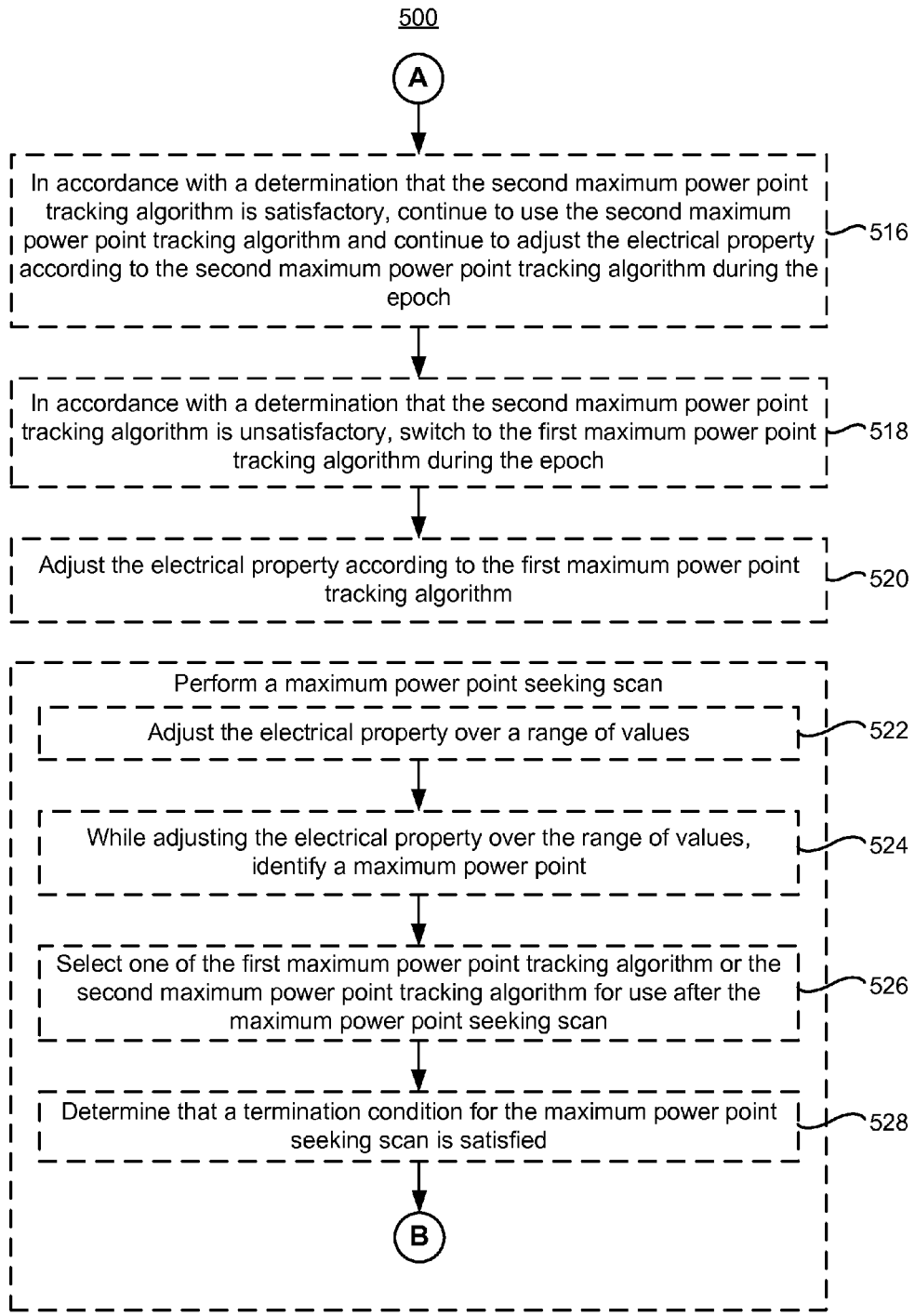

In FIG. 5B, in some implementations, in accordance with a determination that the second maximum power point tracking algorithm is satisfactory, the controller 102 continues to use the second maximum power point tracking algorithm and continues to adjust the electrical property according to the second maximum power point tracking algorithm during the epoch (516) (e.g., with the power output control module 432).

In some implementations, in accordance with a determination that the second maximum power point tracking algorithm is unsatisfactory, the controller 102 switches to the first maximum power point tracking algorithm during the epoch (518) (e.g., with the MPPT module 426), and adjusts the electrical property according to the first maximum power point tracking algorithm (520) (e.g., with the power output control module 432).

In some implementations, the controller 102 performs a maximum power point seeking scan, described with respect to (522)-(532). In some implementations, the controller 102 adjusts the electrical property over a range of values (522) (e.g., with the power output control module 432). In some implementations, the range of values corresponds to a range of duty cycle values of a transistor that couples an external load to an energy capture device. In some implementations, the range of duty cycle values is from 100%-0%. In some implementations, the range of duty cycle values is from 100% towards 0%, terminating at a duty cycle value corresponding to a point at which a certain condition is satisfied (e.g., the slope of the power curve satisfies a condition). In some implementations, the range of duty cycle values is any other appropriate range.

In some implementations, the controller 102, while adjusting the electrical property over the range of values, identifies a maximum power point (524) (e.g., with the MPPT module 426). In some implementations, identifying the maximum power point includes determining a value of an electrical characteristic (e.g., a duty cycle) that corresponds to a highest power produced by an energy capture device during the maximum power point seeking scan. For example, as described above, the controller 102 determines the power produced by the solar panel at various points during the scan, and determines whether that value is the highest power detected during the scan. If it is the highest value, the controller 102 stores the duty cycle at which that power occurred. If it is not the highest value, the controller 102 does not store the value. Once the maximum power point seeking scan ends, the stored value will correspond to the maximum power point for the contemporaneous environmental condition.

In some implementations, the controller 102 selects one of the first maximum power point tracking algorithm or the second maximum power point tracking algorithm for use after the maximum power point seeking scan (526) (e.g., with the MPPT module 426). For example, in some implementations, the controller 102 determines the intensity of the radiant energy based on the slope (or a value indicative of the slope) of the power curve in the constant current region of the power curve. Additional details relating to determining whether to select the first or the second maximum power point tracking algorithm are discussed above.

In some implementations, the controller 102 determines that a termination condition for the maximum power point seeking scan is satisfied (528) (e.g., with the MPPT module 426). In some implementations, the termination condition for the maximum power point seeking scan is satisfied when a power trend (e.g., a value that corresponds to a slope of a power curve) is indicative that the slope has become negative, is negative for a predetermined number of steps (e.g., 5), and/or is increasingly negative for a certain number of steps (e.g., each power trend value (e.g., slope) is more negative than the last value for a certain number of steps).

Figure 5C:
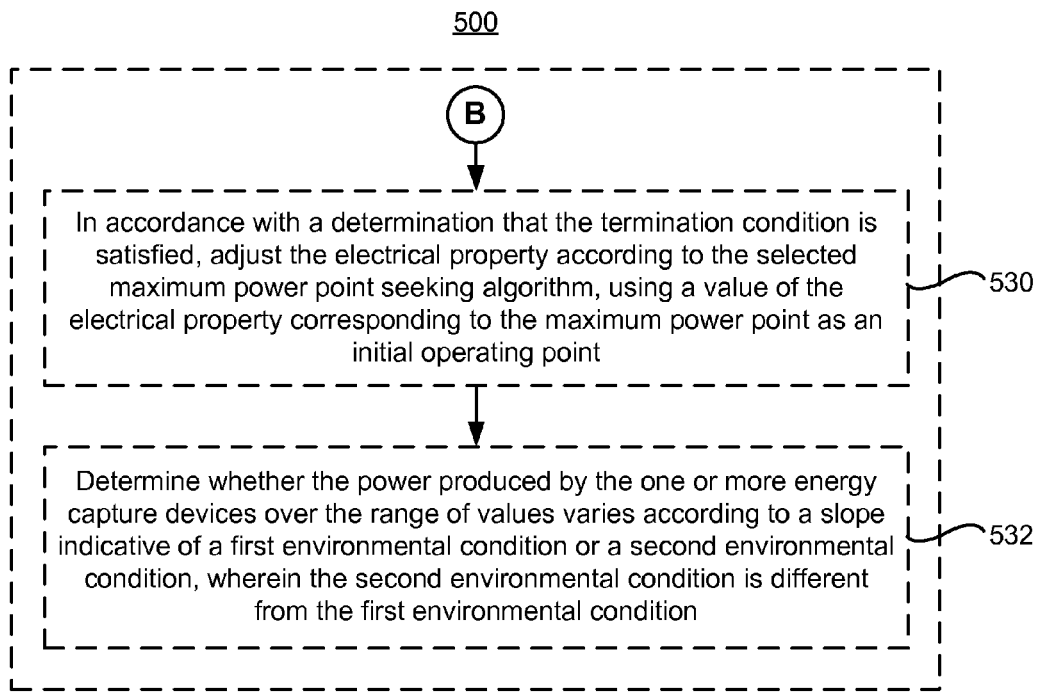

In FIG. 5C, in some implementations, in accordance with a determination that the termination condition is satisfied, the controller 102 adjusts the electrical property according to the selected maximum power point seeking algorithm, using a value of the electrical property corresponding to the maximum power point as an initial operating point (530) (e.g., with the power output control module 432). For example, if the controller 102 determines, from the maximum power point seeking scan, that it is a sunny day, and the maximum point corresponds to a duty cycle value of 54%, then, once the termination condition is satisfied, the controller 102 initiates the first maximum power point tracking algorithm (e.g., the sunny day MPPT algorithm), and begins operating at a duty cycle of 54%, at which time the first maximum power point tracking algorithm will begin to track the maximum power point as described herein.

In some implementations, the controller 102 determines whether the power produced by the one or more energy capture devices over the range of values varies according to a slope indicative of a first environmental condition or a second environmental condition, wherein the second environmental condition is different from the first environmental condition (532) (e.g., with the MPPT module 426). For example, in some implementations, the first environmental condition corresponds to a high radiant energy condition (e.g., a sunny day), characterized by a relatively steeper slope of a power curve (e.g., 1), and the second environmental condition corresponds to a low radiant energy condition (e.g., a cloudy day), and is characterized by a relatively shallower slope (e.g., 0.5).

In some implementations, a determination that the first maximum power point tracking algorithm is satisfactory (508) is made in accordance with (and/or in response to) a determination that the power produced by the one or more energy capture devices over the range of values varies according to a slope indicative of the first environmental condition (e.g., at (532)). In some implementations, a determination that the first maximum power point tracking algorithm is unsatisfactory (510) is made in accordance with (and/or in response to) a determination that the power produced by the one or more energy capture devices over the range of values varies according to a slope indicative of the second environmental condition (e.g., at (532)).

In some implementations, a determination that the second maximum power point tracking algorithm is satisfactory (516) is made in accordance with (and/or in response to) a determination that the power produced by the one or more energy capture devices over the range of values varies according to a slope indicative of the second environmental condition (e.g., at (532)). In some implementations, a determination that the second maximum power point tracking algorithm is unsatisfactory (518) is made in accordance with (and/or in response to) a determination that the power produced by the one or more energy capture devices over the range of values varies according to a slope indicative of the first environmental condition (e.g., at (532)).

Figure 5D:
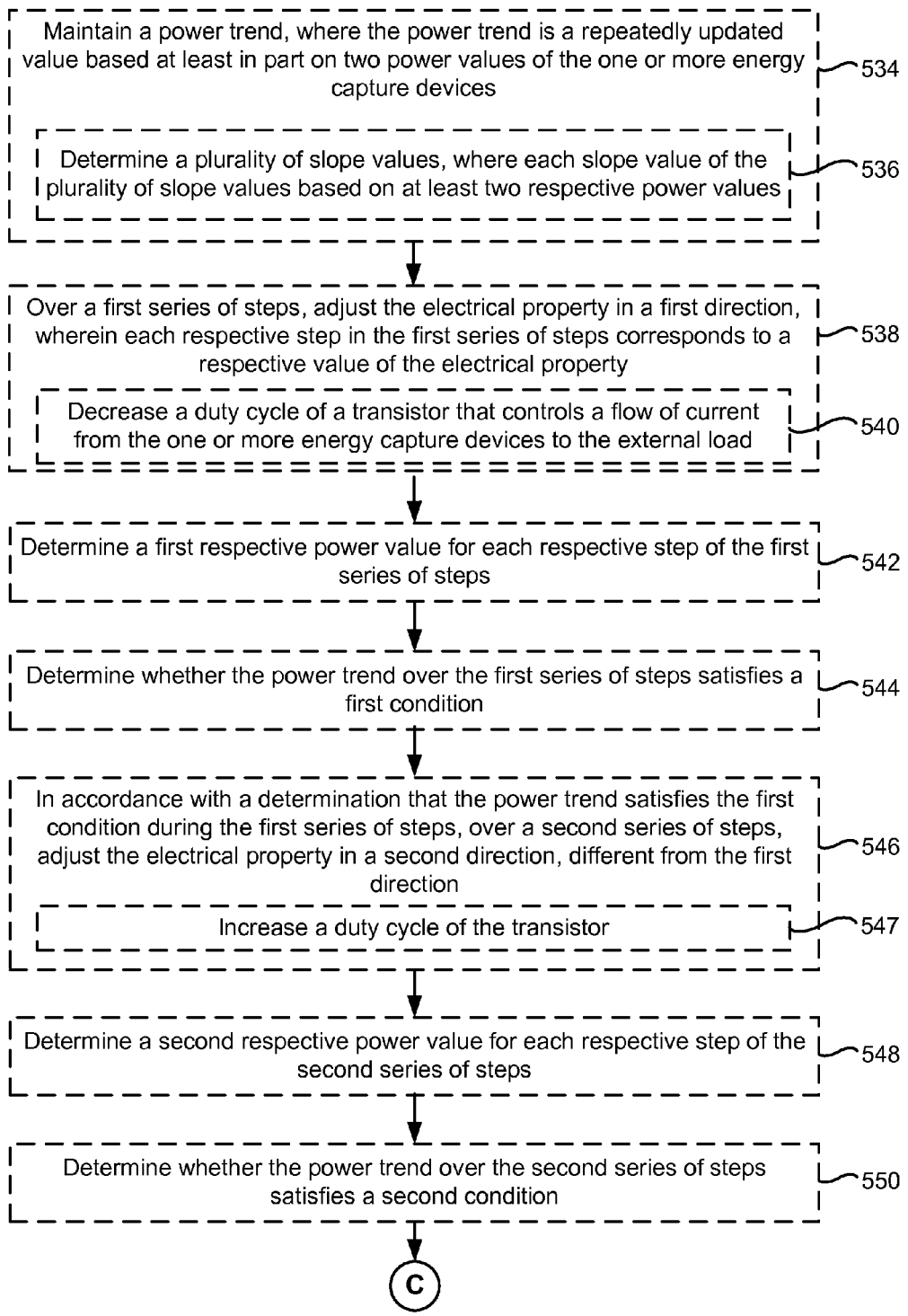

In FIG. 5D, in some implementations, in order to adjust the electrical property according to the first maximum power point tracking algorithm (504) and/or the second maximum power point tracking algorithm (512), the controller 102 maintains a power trend (534), where the power trend is a repeatedly updated value based at least in part on two power values of the one or more energy capture devices. In some implementations, power values are measures of electrical power produced by the one or more energy capture devices. The measures of electrical power reflect the power produced by the one or more energy capture devices at a particular step (e.g., an average power value for the duration of a step), periodically (e.g., at a predetermined interval), or any other appropriate times or intervals. In some implementations, each power value is determined by measuring only a current value corresponding to a flow of current from the one or more energy capture devices. In some implementations, the controller 102 maintains the power trend by determining a plurality of slope values, where each slope value of the plurality of slope values is based on at least two respective power values (536) (e.g., with the MPPT module 426).

In some implementations, over a first series of steps, the controller 102 adjusts the electrical property in a first direction, wherein each respective step in the first series of steps corresponds to a respective value of the electrical property (538) (e.g., with the power output control module 432). Thus, the controller 102 operates at one duty cycle value for a certain amount of time (i.e., a first step), and then operates at another duty cycle for a certain amount of time (i.e., a second step), and so on. In some implementations, the controller 102 adjusts the electrical property in the first direction by decreasing a duty cycle of a transistor that controls a flow of current from the one or more energy capture devices to the external load (540) (e.g., with the power output control module 432).

In some implementations, the controller 102 determines a first respective power value for each respective step of the first series of steps (542) (e.g., with the MPPT module 426). In some implementations, the power values for each respective step are used to determine the power trend over the first series of steps (and/or a subset of the first series of steps).

In some implementations, the controller determines whether the power trend over the first series of steps satisfies a first condition (544) (e.g., with the MPPT module 426). In some implementations, the power trend satisfies the first condition when the power trend is negative for a predetermined number of steps. In some implementations, the power trend satisfies the first condition when a change in the power trend over a plurality of steps satisfies a third condition. As described above, in some implementations, the power trend is a slope of the power curve based on power values at two or more points along the curve. Accordingly, in some implementations, the change in the power trend over the plurality of steps satisfies the third condition when the slope is becoming increasingly negative at a sufficient rate. In other words, if the slope (i.e., power trend) from 306 to 308 (FIG. 3) is −3, and the slope (i.e., power trend) from 308 to 310 (FIG. 3) is −7, the third condition will be satisfied because the rate of change of the slope became increasingly negative at a sufficient (i.e., threshold) rate. On the other hand, if the slope from 308 to 310 had remained at −3, the third condition would not have been satisfied because the slope remained constant (i.e., did not become more negative) across these steps. Further, if the slope is becoming increasingly negative at a low rate (e.g., the slope changed from −3 to −4), in some implementations, this will not be enough to satisfy the third condition. The particular values and conditions in this description are merely examples, and other appropriate values and conditions (i.e., the particular rate of change of a slope that will satisfy the third condition) may be substituted.

In accordance with a determination that the power trend satisfies the first condition during the first series of steps, the controller 102, over a second series of steps, adjusts the electrical property in a second direction, different from the first direction (546) (e.g., with the power output control module 432). In some implementations, the controller 102 adjusts the electrical property in the second direction by increasing the duty cycle of the transistor (547) (e.g., with the power output control module 432). Increasing the duty cycle results in traversing the power curve in a negative x-direction, as discussed above with respect to FIGS. 2A-2E and 3.

In some implementations, the controller 102 determines a second respective power value for each respective step of the second series of steps (548) (e.g., with the MPPT module 426). In some implementations, the power values for each respective step are used to determine the power trend over the first series of steps (and/or a subset of the first series of steps).

In some implementations, the controller 102 determines whether the power trend over the second series of steps satisfies a second condition (550) (e.g., with the MPPT module 426). In some implementations, the power trend satisfies the second condition when the power trend is substantially constant for a predetermined number of steps. In some implementations, the power trend satisfies the second condition when the slope of the power curve is constant for 1, 2, 3, 4, 5, 6, 7, 8, 9, or 10 steps, or any other appropriate number of steps. In some implementations, the power trend satisfies the second condition when the power trend is indicative of a constant current condition of the energy capture device for a predetermined number of steps. In some implementations, the power trend is indicative of a constant current condition when the slope of the power curve is constant for a certain number of steps (e.g., 1, 2, 3, 4, 5, 6, 7, 8, 9, or 10, or any other appropriate number of steps. In some implementations, the power trend satisfies the second condition when the power trend is substantially equal to 1.

Figure 5E:
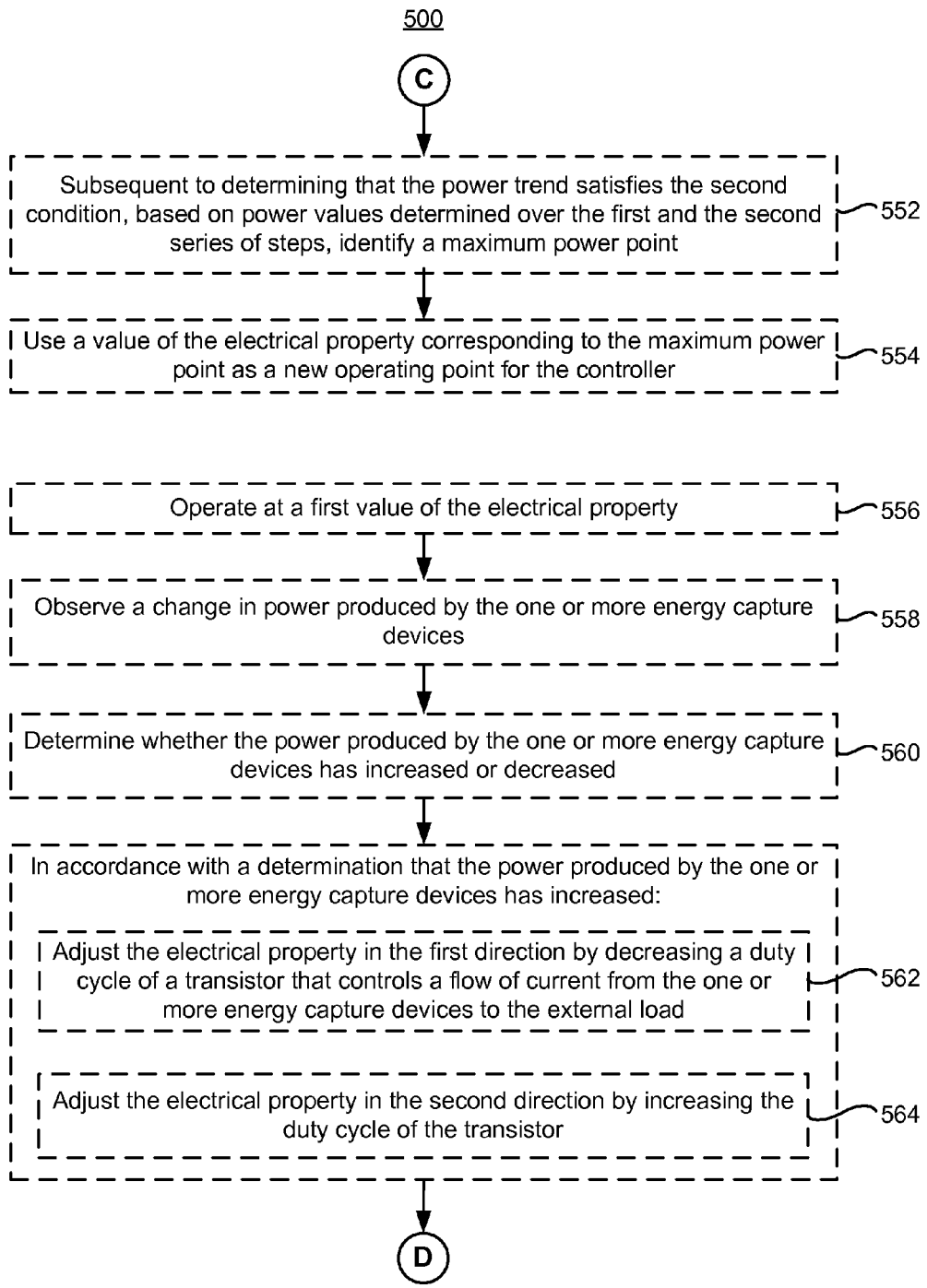

In FIG. 5E, in some implementations, subsequent to determining that the power trend satisfies the second condition, the controller 102, based on power values determined over the first series of steps (538) and the second series of steps (546), identifies a maximum power point (552) (e.g., with the MPPT module 426). For example, as described above, the maximum power point corresponds to a point at which the power trend is indicative of a slope of zero. Thus, during the first and second series of steps, the controller 102 determines power values at various steps, where each step corresponds to a particular value of the electrical characteristic (e.g., duty cycle). In some implementations, when the controller 102 identifies that the power trend is zero at the same power point for both the first and the second series of steps, that power point is deemed the maximum power point.

In some implementations, the controller 102 uses a value of the electrical property corresponding to the maximum power point as a new operating point for the controller (554) (e.g., with the power output control module 432). For example, as described above, the controller 102 operates at the new operating point (e.g., the newly identified maximum power point) until an event occurs that causes the controller 102 to either begin to step up or down the power curve in order to locate a new maximum power point, or to perform a maximum power point seeking scan. An example of an event that causes the controller 102 to begin to step up or down the power curve includes determining that, while operating at a point previously determined as a maximum power point, the power being generated by an energy capture device changes, which indicates that the amount and/or intensity of the radiant energy incident on the energy capture device has changed, and the operating point may no longer correspond to the maximum power point. Other examples of events that cause the controller 102 to perform a maximum power point seeking scan include expiry of a timer (e.g., when maximum power point seeking scans are performed periodically), a determination that the controller 102 has been unable to find a point or area in the power curve having a slope at or near zero after a certain number of steps while executing the first or the second MPPT algorithm, and the like.

In some implementations, in order to adjust the electrical property according to the first maximum power point tracking algorithm (504) and/or the second maximum power point tracking algorithm (512), the controller 102 operates at a first value of the electrical property (556) (e.g., with the power output control module 432). For example, the controller 102 operates a transistor at a first duty cycle value. In some implementations, the first value of the electrical property is a maximum power point that was previously determined as a result of a maximum power point seeking scan (522)-(532), or by the first or second MPPT algorithm.

In some implementations, the controller 102 observes a change in power produced by the one or more energy capture devices (558) (e.g., with the sensor module 424). In some implementations, the controller 102 determines whether the power produced by the one or more energy capture devices has increased or decreased (560) (e.g., with the MPPT module 426). For example, the controller 102 observes that the power being produced by the one or more energy capture devices increases from 5 W to 10 W, or decreases from 10 W to 5 W. In some implementations, whether the power observed by the controller 102 decreases or increases controls whether the controller 102 begins seeking the new maximum power point by traversing the power curve in the positive or negative x-direction. In particular, if the power increases, the controller 102 begins by traversing the power curve in the positive x-direction, as the new maximum power point is more likely to correspond to a higher voltage (which also corresponds to a lower duty cycle and a higher load impedance). Subsequently, when (and if) the controller 102 detects the first condition (e.g., described above with respect to (544)), the controller 102 reverses direction and begins traversing the power curve in the negative x-direction. Accordingly, under these conditions, the first direction corresponds to traversing the power curve in the positive x-direction, and the second direction corresponds to traversing the power curve in the negative x-direction. On the other hand, if the power decreases, the first and the second direction are reversed. Specifically, the controller 102 begins by traversing the power curve in the negative x-direction, and, once the controller 102 detects the second condition (e.g., described above with respect to (550)), it reverses direction and begins traversing the power curve in the positive x-direction. Thus, under these conditions, the first direction corresponds to traversing the power curve in the negative x-direction, and the second direction corresponds to traversing the power curve in the positive x-direction.

Figure 5F:
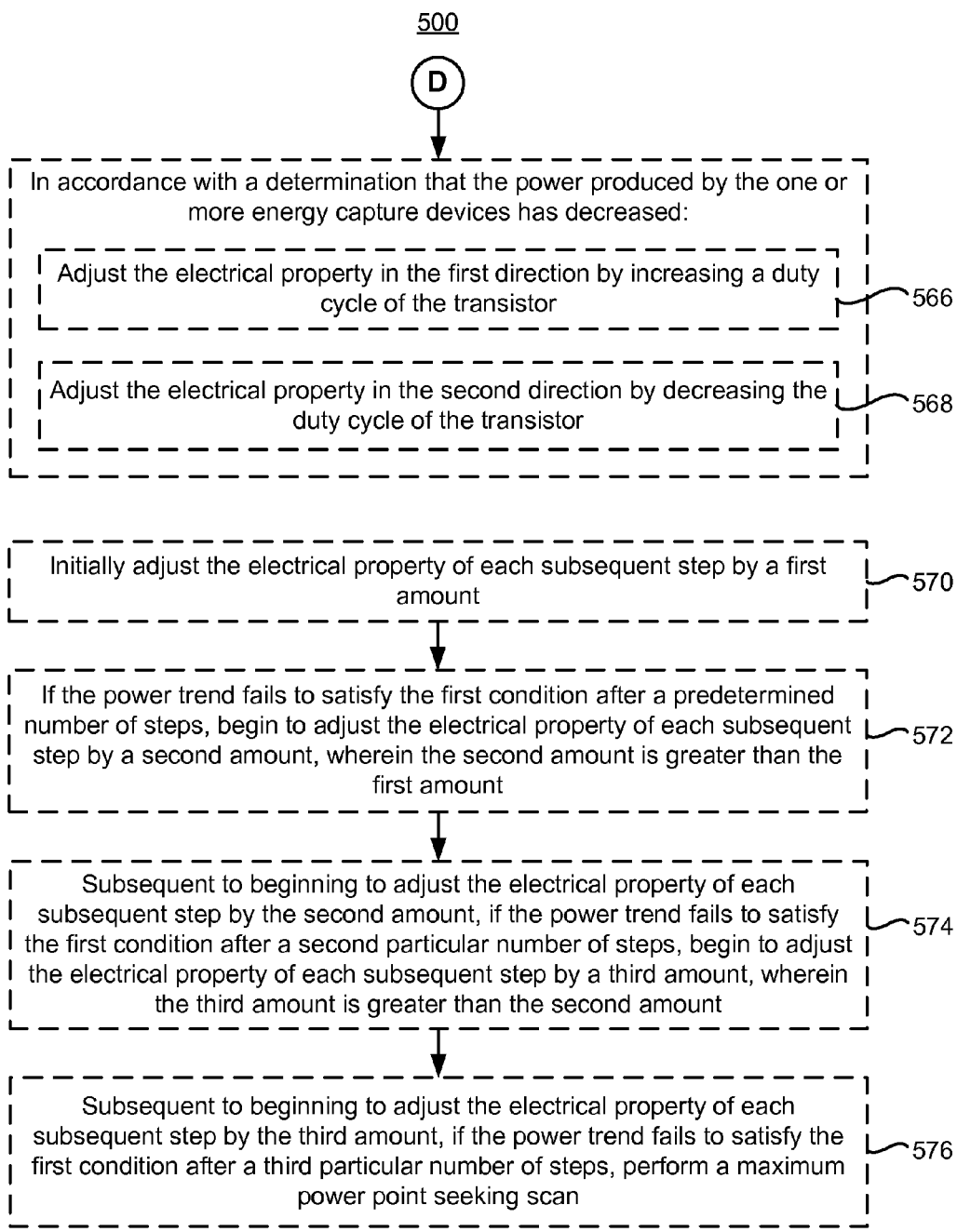

In FIG. 5F, in some implementations, in accordance with a determination that the power produced by the one or more energy capture devices has increased, the controller 102 adjusts the electrical property in the first direction by decreasing a duty cycle of a transistor that controls a flow of current from the one or more energy capture devices to the external load (562) (e.g., with the power output control module 432), and adjusts the electrical property in the second direction by increasing the duty cycle of the transistor (564) (e.g., with the power output control module 432).

Accordingly, in some implementations, in accordance with a determination that the power produced by the one or more energy capture devices has decreased, the controller 102 adjusts the electrical property in the first direction by increasing the duty cycle of the transistor (566) (e.g., with the power output control module 432), and adjusts the electrical property in the second direction by decreasing the duty cycle of the transistor (568) (e.g., with the power output control module 432). Where the first direction corresponds to traversing the power curve in the negative x-direction (e.g., increasing the duty cycle of the transistor), and the second direction corresponds to traversing the power curve in the positive x-direction (e.g., decreasing the duty cycle of the transistor), the first and second conditions are established so as to correspond to this convention. For example, the first condition is satisfied when the power trend is indicative that the slope of the power curve has been substantially constant for a certain duration (e.g., a certain number of steps), and the second condition is satisfied when the power trend is indicative that the slope has become negative, is negative for a predetermined number of steps (e.g., 5), and/or is increasingly negative for a certain number of steps. Thus, the first and the second condition are determined based, at least in part, on whether the first direction corresponds to traversing the power curve in the positive x-direction or in the negative x-direction.

In some implementations, the first maximum power point tracking algorithm and the second maximum power point tracking algorithm both operate by stepping up and down the power curve in order to identify the maximum power point. In some implementations, the first and second maximum power point algorithms differ in their respective minimum step sizes. More particularly, as described above, the first and second maximum power point tracking algorithms increase the step size during operation in order to more rapidly locate a maximum power point. Thus, if the controller 102 is operating at a small step size (e.g., increasing and/or decreasing the duty cycle by 1%), but the maximum power point has shifted a great distance from the previous operating point, the controller increases the step size so as to increase the speed at which the maximum power point is identified. For example, the controller 102 increases the step size to 2% and, if the controller 102 does not reach the maximum power point, the controller 102 begins taking larger steps of 5%. Because of the difference in the shape of the power curve between high and low radiant energy conditions, however, the same minimum step size may not be ideal for both algorithms. For example, if the controller 102 has to traverse 40% of the duty cycle of a transistor in order to locate the maximum power point under low radiant energy conditions, a 1% step size may result in the controller 102 operating too slowly and being unable to find the maximum power point in a reasonable time. Accordingly, in some implementations, the minimum step size for a low radiant energy condition is larger than the minimum step size for high radiant energy conditions.

Accordingly, in some implementations, when adjusting the electrical property according to the first maximum power point tracking algorithm (e.g., at (504)), a minimum difference in the value of the electrical property (e.g., the duty cycle of a transistor) between two adjacent steps is a first value, and when adjusting the electrical property according to the second maximum power point tracking algorithm (e.g., at (512)), the minimum difference in the value of the electrical property (e.g., the duty cycle of the transistor) between two adjacent steps is a second value that is greater than the first value. In some implementations, the first value (i.e., the minimum difference between two adjacent steps in the first MPPT algorithm) is 1% and the second value (i.e., the minimum difference between two adjacent steps in the second MPPT algorithm) is 5%. Other values for the minimum differences are also contemplated.

In some implementations, adjusting the electrical property in the first direction (e.g., at (538)) and/or in the second direction (e.g., at (546)) includes initially adjusting the electrical property of each subsequent step by a first amount (570) (e.g., with the power output control module 432). In some implementations, the first amount corresponds to a minimum difference in the value of the electrical property between two steps. For example, in some implementations, the first amount is a 1% increase or decrease in the duty cycle of a transistor between steps. In some implementations, if the power trend fails to satisfy the first condition after a predetermined number of steps, the controller 102 begins to adjust the electrical property of each subsequent step by a second amount, wherein the second amount is greater than the first amount (572) (e.g., with the power output control module 432). For example, using one possible first condition, if the power trend fails to become negative after a particular number of steps (e.g., 1, 2, 3, 4, 5, 6, 7, 8, 9, or 10 steps, or any other appropriate number of steps), then the controller 102 begins to adjust the electrical property of each subsequent step by a second, greater amount (e.g., 2%). In some implementations, subsequent to beginning to adjust the electrical property of each subsequent step by the second amount, if the power trend fails to satisfy the first condition after a second particular number of steps, the controller 102 begins to adjust the electrical property of each subsequent step by a third amount, wherein the third amount is greater than the second amount (574) (e.g., with the power output control module 432). Continuing the example set forth above, if the power trend fails to become negative after a second particular number of steps (e.g., 1, 2, 3, 4, 5, 6, 7, 8, 9, or 10 steps, or any other appropriate number of steps), then the controller begins to adjust the electrical property of each subsequent step by a third, greater amount (e.g., 5%). The particular step sizes listed are merely examples, and other step sizes are also contemplated. For example, different MPPT algorithms may use different step sizes. Particularly, in some implementations, in a second MPPT algorithm, the minimum step size is 5%, instead of the 1% minimum step size for a first MPPT algorithm. Accordingly, the step sizes in the second MPPT algorithm are increased, for example, from 5% to 7%, and then from 7% to 10%. In some implementations, an increase in step size (i.e., adjusting the electrical property of each subsequent step by a greater amount) corresponds to an absolute value difference between steps. Accordingly, an increase in step size increases the absolute value of the difference between two steps, regardless of whether those steps are in the positive x-direction or the negative x-direction. As a specific example, increasing the step size from 1% to 2% results in the controller 102 decreasing the duty cycle by −2% over each step (e.g., from 58% to 56% to 54%, etc.) when traversing the power curve in the positive x-direction, and increasing the duty cycle by +2% (e.g., from 54% to 56% to 58%, etc.) when traversing the power curve in the negative x-direction.

In some implementations, subsequent to beginning to adjust the electrical property of each subsequent step by the third amount, if the power trend fails to satisfy the first condition after a third particular number of steps, the controller 102 performs a maximum power point seeking scan (576) (e.g., with the MPPT module 426). For example, continuing the example set forth above, if the power trend fails to become negative after a third particular number of steps (e.g., 1, 2, 3, 4, 5, 6, 7, 8, 9, or 10 steps, or any other appropriate number of steps), then the controller initiates the maximum power point seeking scan. In particular, being unable to identify the maximum power point after twice increasing the step size (e.g., at (572)-(576)) suggests that it is more efficient to perform a maximum power point seeking scan than to continue to seek according to the first or second MPPT algorithm. Accordingly, the controller 102 ceases the steady state operation and instead performs the maximum power point seeking scan to identify the maximum power point and to determine which MPPT algorithm to use thereafter. The maximum power point seeking scan is described with reference to (522)-(532), and will not be repeated here.

The foregoing example describes that the maximum power point seeking scan is triggered in response to failure to locate a maximum power point after increasing the step size twice (i.e., performing three groups of steps, each group having larger step sizes than the previous group). In some implementations, the controller 102 performs the maximum power point seeking scan after more or fewer groups of steps. For example, in some implementations, the controller 102 takes 5 groups of steps, each group having step sizes 1% larger than the previous group, and performs the maximum power point seeking scan if the maximum power point is not found after the 5 groups of steps are completed. Other step sizes and numbers of groups are also contemplated.

Plural instances may be provided for components, operations (e.g., method steps), or structures described herein as a single instance. Also, boundaries between various components, operations (e.g., method steps), and data stores are somewhat arbitrary, and particular operations are illustrated in the context of specific illustrative configurations. Other allocations of functionality are envisioned and may fall within the scope of the implementation(s). In general, structures and functionality presented as separate components or operations in the example configurations may be implemented as a combined structure, component, or operation. Similarly, structures and functionality presented as a single component or operation may be implemented as separate components or operations. These and other variations, modifications, additions, and improvements fall within the scope of the implementation(s). Moreover, operations that are depicted or described as occurring in a particular order may be performed in other orders, and operations that are depicted as being combined into a single method, process, technique, or the like, may be omitted or combined with other operations according to various implementations.

It will also be understood that, although the terms "first," "second," etc. may be used herein to describe various elements, these elements should not be limited by these terms. These terms are only used to distinguish one element from another. For example, a first algorithm could be termed a second algorithm, and, similarly, a second algorithm could be termed a first algorithm, without changing the meaning of the description, so long as all occurrences of the "first algorithm" are renamed consistently and all occurrences of the "second algorithm" are renamed consistently.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A controller for controlling operation of a solar power system, the controller characterized by an operating point and comprising:
   an input configured to receive electrical power from one or more energy capture devices;
   an output configured to provide electrical power to an external load;
   one or more processors;
   memory; and one or more programs, the one or more programs stored in the memory and configured to be executed by the one or more processors, the one or more programs including instructions for:
  initiating a first maximum power point tracking algorithm during an epoch;
  adjusting, according to the first maximum power point tracking algorithm, an electrical property affecting an apparent load resistance applied to the one or more energy capture devices;
  prior to an end of the epoch, determining whether the first maximum power point tracking algorithm is satisfactory;
    in accordance with a determination that the first maximum power point tracking algorithm is satisfactory, continuing to use the first maximum power point tracking algorithm and continuing to adjust the electrical property according to the first maximum power point tracking algorithm during the epoch; and
    in accordance with a determination that the first maximum power point tracking algorithm is unsatisfactory, performing a method comprising (i) switching to a second maximum power point tracking algorithm during the epoch, and (ii) adjusting the electrical property according to the second maximum power point tracking algorithm,
  wherein the first maximum power point tracking algorithm is different from the second maximum power point tracking algorithm; and wherein
  the first maximum power point tracking algorithm corresponds to a first power production characteristic of the one or more energy capture devices;
  the second maximum power point tracking algorithm corresponds to a second power production characteristic of the one or more energy capture devices; and
  a determination that the first maximum power point tracking algorithm is unsatisfactory corresponds to a determination that the one or more energy capture devices are operating according to the second power production characteristic; and wherein
  the first power production characteristic corresponds to a condition of higher illuminance of the one or more energy capture devices as compared to the second power production characteristic.

2. A controller for controlling operation of a solar power system, the controller characterized by an operating point and comprising:
  an input configured to receive electrical power from one or more energy capture devices;
  an output configured to provide electrical power to an external load;
  one or more processors;
  memory; and
  one or more programs, the one or more programs stored in the memory and configured to be executed by the one or more processors, the one or more programs including instructions for:
    initiating a first maximum power point tracking algorithm during an epoch;
    adjusting, according to the first maximum power point tracking algorithm, an electrical property affecting an apparent load resistance applied to the one or more energy capture devices;
    prior to an end of the epoch, determining whether the first maximum power point tracking algorithm is satisfactory;
      in accordance with a determination that the first maximum power point tracking algorithm is satisfactory, continuing to use the first maximum power point tracking algorithm and continuing to adjust the electrical property according to the first maximum power point tracking algorithm during the epoch; and
      in accordance with a determination that the first maximum power point tracking algorithm is unsatisfactory, performing a method comprising (i) switching to a second maximum power point tracking algorithm during the epoch, and (ii) adjusting the electrical property according to the second maximum power point tracking algorithm,
    wherein the first maximum power point tracking algorithm is different from the second maximum power point tracking algorithm; and wherein
    the first maximum power point tracking algorithm corresponds to a first power production characteristic of the one or more energy capture devices;
    the second maximum power point tracking algorithm corresponds to a second power production characteristic of the one or more energy capture devices; and
    a determination that the first maximum power point tracking algorithm is unsatisfactory corresponds to a determination that the one or more energy capture devices are operating according to the second power production characteristic; and wherein
    the first power production characteristic corresponds to direct sunlight conditions, and the second power production characteristic corresponds to at least partially indirect sunlight conditions.

3. A controller for controlling operation of a solar power system, the controller characterized by an operating point and comprising:
  an input configured to receive electrical power from one or more energy capture devices;
  an output configured to provide electrical power to an external load;
  one or more processors;
  memory; and
  one or more programs, the one or more programs stored in the memory and configured to be executed by the one or more processors, the one or more programs including instructions for:
    initiating a first maximum power point tracking algorithm during an epoch;
    adjusting, according to the first maximum power point tracking algorithm, an electrical property affecting an apparent load resistance applied to the one or more energy capture devices;
    prior to an end of the epoch, determining whether the first maximum power point tracking algorithm is satisfactory;
      in accordance with a determination that the first maximum power point tracking algorithm is satisfactory, continuing to use the first maximum power point tracking algorithm and continuing to adjust the electrical property according to the first maximum power point tracking algorithm during the epoch; and
      in accordance with a determination that the first maximum power point tracking algorithm is unsatisfactory, performing a method comprising (i) switching to a second maximum power point tracking algorithm during the epoch, and (ii) adjusting the electrical property according to the second maximum power point tracking algorithm,
wherein the first maximum power point tracking algorithm is different from the second maximum power point tracking algorithm; and wherein
the one or more programs further include instructions for performing a maximum power point seeking scan, including instructions for:
adjusting the electrical property over a range of values;
while adjusting the electrical property over the range of values, identifying a maximum power point;
selecting one of the first maximum power point tracking algorithm or the second maximum power point tracking algorithm for use after the maximum power point seeking scan;
determining that a termination condition for the maximum power point seeking scan is satisfied; and
in accordance with a determination that the termination condition is satisfied:
adjusting the electrical property according to the selected maximum power point seeking algorithm, using a value of the electrical property corresponding to the maximum power point as the operating point.

4. The controller of claim 3, the instructions for performing the maximum power point seeking scan further including instructions for determining whether the power produced by the one or more energy capture devices over the range of values varies according to a slope indicative of a first environmental condition or a second environmental condition, wherein the second environmental condition is different from the first environmental condition.

5. The controller of claim 4, the one or more programs further including instructions for:
in accordance with a determination that the power produced by the one or more energy capture devices over the range of values varies according to a slope indicative of a first environmental condition, determining that the first maximum power point tracking algorithm is satisfactory; and
in accordance with a determination that the power produced by the one or more energy capture devices over the range of values varies according to a slope indicative of a second environmental condition, determining that the first maximum power point tracking algorithm is not satisfactory.

6. The controller of claim 4, the one or more programs further including instructions for:
after switching to the second maximum power point tracking algorithm, determining whether the second maximum power point tracking algorithm is satisfactory prior to the end of the epoch;
in accordance with a determination that the second maximum power point tracking algorithm is satisfactory, continuing to use the second maximum power point tracking algorithm and continuing to adjust the electrical property according to the second maximum power point tracking algorithm during the epoch;
in accordance with a determination that the second maximum power point tracking algorithm is unsatisfactory, performing a method comprising (i) switching to the first maximum power point tracking algorithm during the epoch, and (ii) adjusting the electrical property according to the first maximum power point tracking algorithm.

7. The controller of claim 6, the one or more programs further including instructions for:

in accordance with a determination that the power produced by the one or more energy capture devices over the range of values varies according to a slope indicative of the second environmental condition, determining that the second maximum power point tracking algorithm is satisfactory; and
in accordance with a determination that the power produced by the one or more energy capture devices over the range of values varies according to a slope indicative of the first environmental condition, determining that the second maximum power point tracking algorithm is not satisfactory.

8. A controller for controlling operation of a solar power system, the controller characterized by an operating point and comprising:
an input configured to receive electrical power from one or more energy capture devices;
an output configured to provide electrical power to an external load;
one or more processors;
memory; and
one or more programs, the one or more programs stored in the memory and configured to be executed by the one or more processors, the one or more programs including instructions for:
initiating a first maximum power point tracking algorithm during an epoch;
adjusting, according to the first maximum power point tracking algorithm, an electrical property affecting an apparent load resistance applied to the one or more energy capture devices;
prior to an end of the epoch, determining whether the first maximum power point tracking algorithm is satisfactory;
in accordance with a determination that the first maximum power point tracking algorithm is satisfactory, continuing to use the first maximum power point tracking algorithm and continuing to adjust the electrical property according to the first maximum power point tracking algorithm during the epoch; and
in accordance with a determination that the first maximum power point tracking algorithm is unsatisfactory, performing a method comprising (i) switching to a second maximum power point tracking algorithm during the epoch, and (ii) adjusting the electrical property according to the second maximum power point tracking algorithm,
wherein the first maximum power point tracking algorithm is different from the second maximum power point tracking algorithm; and wherein
the instructions for adjusting the electrical property according to the first maximum power point tracking algorithm and/or the second maximum power point tracking algorithm include instructions for:
while maintaining a power trend, wherein the power trend is a repeatedly updated value based at least in part on two power values of the one or more energy capture devices:
over a first series of steps, adjusting the electrical property in a first direction, wherein each respective step in the first series of steps corresponds to a respective value of the electrical property;
determining a first respective power value for each respective step of the first series of steps;
determining whether the power trend over the first series of steps satisfies a first condition;

in accordance with a determination that the power trend satisfies the first condition during the first series of steps:
over a second series of steps, adjusting the electrical property in a second direction, different from the first direction;
determining a second respective power value for each respective step of the second series of steps;
determining whether the power trend over the second series of steps satisfies a second condition; and
subsequent to determining that the power trend satisfies the second condition:
based on power values determined over the first and the second series of steps, identifying a maximum power point; and
using a value of the electrical property corresponding to the maximum power point as the operating point for the controller.

9. The controller of claim 8, wherein the instructions for maintaining the power trend include instructions for determining a plurality of slope values, each slope value of the plurality of slope values being based on at least two respective power values.

10. The controller of claim 8, wherein:
the instructions for adjusting the electrical property in the first direction include instructions for decreasing a duty cycle of a transistor that controls a flow of current from the one or more energy capture devices to the external load; and
the instructions for adjusting the electrical property in the second direction include instructions for increasing the duty cycle of the transistor.

11. The controller of claim 8, wherein the power trend satisfies the first condition when the power trend is negative for a predetermined number of steps.

12. The controller of claim 8, wherein the power trend satisfies the first condition when a change in the power trend over a plurality of steps satisfies a third condition.

13. The controller of claim 12, wherein the power trend satisfies the second condition when the power trend is substantially constant for a predetermined number of steps.

14. The controller of claim 13, wherein the power trend satisfies the second condition when the power trend is indicative of a constant current condition of the energy capture device for a predetermined number of steps.

15. The controller of claim 14, wherein the power trend satisfies the second condition when the power trend is substantially equal to 1.

16. The controller of claim 15, wherein the second condition is different from the first condition.

17. The controller of claim 8, wherein the instructions for adjusting the electrical property according to the first maximum power point tracking algorithm and/or the second maximum power point tracking algorithm further include instructions for:
operating the controller at a first value of the electrical property;
observing a change in power produced by the one or more energy capture devices;
determining whether the power produced by the one or more energy capture devices has increased or decreased;
in accordance with a determination that the power produced by the one or more energy capture devices has increased:
adjusting the electrical property in the first direction includes decreasing a duty cycle of a transistor that controls a flow of current from the one or more energy capture devices to the external load; and
adjusting the electrical property in the second direction includes increasing the duty cycle of the transistor; and
in accordance with a determination that the power produced by the one or more energy capture devices has decreased:
adjusting the electrical property in the first direction includes increasing the duty cycle of the transistor; and
adjusting the electrical property in the second direction includes decreasing the duty cycle of the transistor.

18. The controller of claim 8, wherein:
when adjusting the electrical property according to the first maximum power point tracking algorithm, a minimum difference in the value of the electrical property between two adjacent steps is a first value; and
when adjusting the electrical property according to the second maximum power point tracking algorithm, the minimum difference in the value of the electrical property between two adjacent steps is a second value that is greater than the first value.

19. The controller of claim 8, wherein the instructions for adjusting the electrical property in the first direction over the first series of steps include instructions for:
initially adjusting the electrical property of each subsequent step by a first amount;
if the power trend fails to satisfy the first condition after a predetermined number of steps, beginning to adjust the electrical property of each subsequent step by a second amount, wherein the second amount is greater than the first amount; and
subsequently, if the power trend fails to satisfy the first condition after a second particular number of steps, beginning to adjust the electrical property of each subsequent step by a third amount, wherein the third amount is greater than the second amount.

20. The controller of claim 19, wherein the instructions for adjusting the electrical property in the first direction over the first series of steps further include instructions for:
subsequent to beginning to adjust the electrical property of each subsequent step by the third amount, if the power trend fails to satisfy the first condition after a third particular number of steps, performing a maximum power point seeking scan, including, over a fourth series of steps:
adjusting the electrical property in the first direction;
identifying a maximum power point over the fourth series of steps;
selecting one of the first maximum power point tracking algorithm or the second maximum power point tracking algorithm for use after the maximum power point seeking scan;
determining whether the power trend over the fourth series of steps satisfies the first condition; and
in accordance with a determination that the power trend satisfies the first condition:
adjusting the electrical property according to the selected maximum power point seeking algorithm, using a value of the electrical property corresponding to the maximum power point as an initial operating point.

21. The controller of claim 20, wherein each respective power value corresponds to an electrical power provided by the one or more energy capture devices during a step.

22. The controller of claim 20, wherein each respective power value is determined by measuring only a current value corresponding to a flow of current from the one or more energy capture devices.

23. A method for tracking a maximum power point of one or more energy capture devices, comprising:
at a controller with one or more processors and memory storing one or more programs for execution by the one or more processors, the controller characterized by an operating point; providing the one or more programs with instructions:
initiating a first maximum power point tracking algorithm during an epoch;
adjusting, according to the first maximum power point tracking algorithm, an electrical property affecting an apparent load resistance applied to the one or more energy capture devices;
prior to an end of the epoch, determining whether the first maximum power point tracking algorithm is satisfactory;
in accordance with a determination that the first maximum power point tracking algorithm is satisfactory, continuing to use the first maximum power point tracking algorithm and continuing to adjust the electrical property according to the first maximum power point tracking algorithm during the epoch; and
in accordance with a determination that the first maximum power point tracking algorithm is unsatisfactory, performing a method comprising (i) switching to a second maximum power point tracking algorithm during the epoch, and (ii) adjusting the electrical property according to the second maximum power point tracking algorithm,
wherein the first maximum power point tracking algorithm is different from the second maximum power point tracking algorithm and wherein
the first maximum power point tracking algorithm corresponds to a first power production characteristic of the one or more energy capture devices;
the second maximum power point tracking algorithm corresponds to a second power production characteristic of the one or more energy capture devices; and
a determination that the first maximum power point tracking algorithm is unsatisfactory corresponds to a determination that the one or more energy capture devices are operating according to the second power production characteristic; and wherein
the first power production characteristic corresponds to direct sunlight conditions, and the second power production characteristic corresponds to at least partially indirect sunlight conditions.

24. An electronic device, comprising:
one or more processors;
memory; and
one or more programs, wherein the one or more programs are stored in the memory and configured to be executed by the one or more processors, the one or more programs including instructions for:
initiating a first maximum power point tracking algorithm during an epoch;
adjusting, according to the first maximum power point tracking algorithm, an electrical property affecting an apparent load resistance applied to the one or more energy capture devices;
prior to an end of the epoch, determining whether the first maximum power point tracking algorithm is satisfactory;
in accordance with a determination that the first maximum power point tracking algorithm is satisfactory, continuing to use the first maximum power point tracking algorithm and continuing to adjust the electrical property according to the first maximum power point tracking algorithm during the epoch; and
in accordance with a determination that the first maximum power point tracking algorithm is unsatisfactory, performing a method comprising (i) switching to a second maximum power point tracking algorithm during the epoch, and (ii) adjusting the electrical property according to the second maximum power point tracking algorithm,
wherein the first maximum power point tracking algorithm is different from the second maximum power point tracking algorithm and wherein
the first maximum power point tracking algorithm corresponds to a first power production characteristic of the one or more energy capture devices;
the second maximum power point tracking algorithm corresponds to a second power production characteristic of the one or more energy capture devices; and
a determination that the first maximum power point tracking algorithm is unsatisfactory corresponds to a determination that the one or more energy capture devices are operating according to the second power production characteristic; and wherein
the first power production characteristic corresponds to direct sunlight conditions, and the second power production characteristic corresponds to at least partially indirect sunlight conditions.

25. A non-transitory computer readable storage medium storing one or more programs, the one or more programs comprising instructions, which when executed by an electronic device, cause the device to:
initiate a first maximum power point tracking algorithm during an epoch;
adjust, according to the first maximum power point tracking algorithm, an electrical property affecting an apparent load resistance applied to the one or more energy capture devices;
prior to an end of the epoch, determine whether the first maximum power point tracking algorithm is satisfactory;
in accordance with a determination that the first maximum power point tracking algorithm is satisfactory, continue to use the first maximum power point tracking algorithm and continue to adjust the electrical property according to the first maximum power point tracking algorithm during the epoch; and
in accordance with a determination that the first maximum power point tracking algorithm is unsatisfactory, perform a method comprising (i) switching to a second maximum power point tracking algorithm during the epoch, and (ii) adjusting the electrical property according to the second maximum power point tracking algorithm,
wherein the first maximum power point tracking algorithm is different from the second maximum power point tracking algorithm and wherein
the first maximum power point tracking algorithm corresponds to a first power production characteristic of the one or more energy capture devices;

the second maximum power point tracking algorithm corresponds to a second power production characteristic of the one or more energy capture devices; and a determination that the first maximum power point tracking algorithm is unsatisfactory corresponds to a determination that the one or more energy capture devices are operating according to the second power production characteristic; and wherein the first power production characteristic corresponds to direct sunlight conditions, and the second power production characteristic corresponds to at least partially indirect sunlight conditions.

* * * * *